(12) United States Patent
Kuba

(10) Patent No.: US 9,292,135 B2
(45) Date of Patent: Mar. 22, 2016

(54) COORDINATE DETECTING DEVICE AND ELECTRONIC INFORMATION BOARD SYSTEM

(71) Applicant: Yasuhiro Kuba, Kanagawa (JP)

(72) Inventor: Yasuhiro Kuba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 5 days.

(21) Appl. No.: 14/302,627

(22) Filed: Jun. 12, 2014

(65) Prior Publication Data

US 2015/0009182 A1    Jan. 8, 2015

(30) Foreign Application Priority Data

Jul. 8, 2013    (JP) .................. 2013-142394

(51) Int. Cl.
 *G06F 3/042* (2006.01)
 *G06F 3/041* (2006.01)

(52) U.S. Cl.
 CPC ............ *G06F 3/0421* (2013.01); *G06F 3/0412* (2013.01)

(58) Field of Classification Search
 CPC ......... G06F 3/041; G06F 3/045; G06F 3/042; G06F 3/033; G06F 3/02; G06K 11/06; G08C 21/00; G09G 5/00; G09G 5/08
 See application file for complete search history.

(56) References Cited

U.S. PATENT DOCUMENTS

| | | | |
|---|---|---|---|
| 5,164,542 A | 11/1992 | Hart | |
| 8,384,693 B2 * | 2/2013 | Newton | 345/175 |
| 8,405,637 B2 * | 3/2013 | Bridger | 345/175 |
| 2001/0022579 A1 * | 9/2001 | Hirabayashi | 345/175 |
| 2011/0141062 A1 * | 6/2011 | Yu et al. | 345/175 |
| 2011/0227848 A1 * | 9/2011 | Furusawa | 345/173 |
| 2013/0135346 A1 | 5/2013 | Sakuramata et al. | |
| 2014/0160494 A1 | 6/2014 | Kuba | |

FOREIGN PATENT DOCUMENTS

| | | |
|---|---|---|
| EP | 2741186 A1 | 6/2014 |
| JP | 2000-200139 | 7/2000 |
| JP | 2001-092595 | 4/2001 |
| JP | 2003-091358 | 3/2003 |
| JP | 4143759 | 9/2008 |
| JP | 4340302 | 10/2009 |

OTHER PUBLICATIONS

Extended European Search Report dated Nov. 18, 2014 issued in corresponding European Application No. 14172635.6.
U.S. Appl. No. 14/096,520, filed Dec. 4, 2013.

\* cited by examiner

*Primary Examiner* — Pegeman Karimi

(74) *Attorney, Agent, or Firm* — Harness, Dickey & Pierce, P.L.C.

(57) ABSTRACT

A coordinate detecting device, which is used in a system including a display section including a display surface, two optical sensor units disposed at one side of the display section and including light emitting and receiving surfaces, and optical reflection members disposed at other three sides of the display section, includes adjustment units adjusting the respective light emitting and receiving surfaces of the optical sensor units where the reflection light is irradiated and received, and impact absorption units absorbing impact applied to the respective optical sensor units.

10 Claims, 20 Drawing Sheets

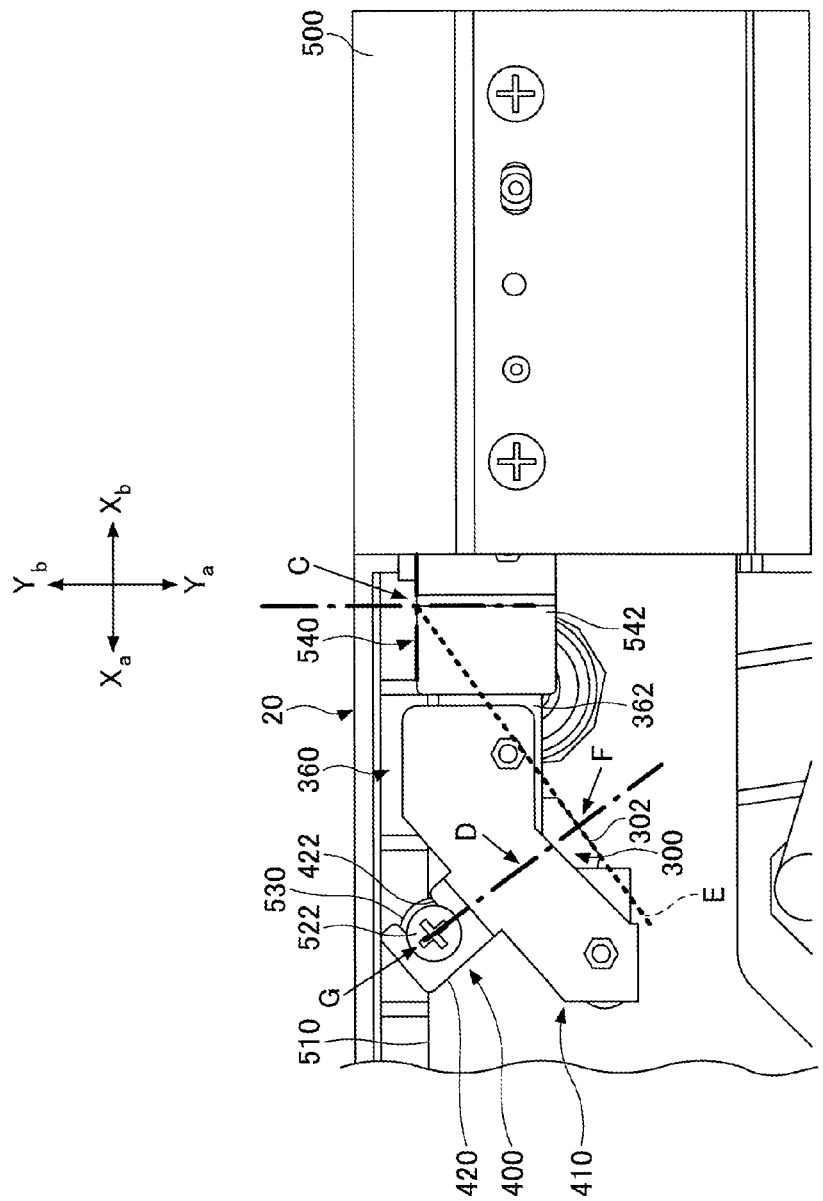

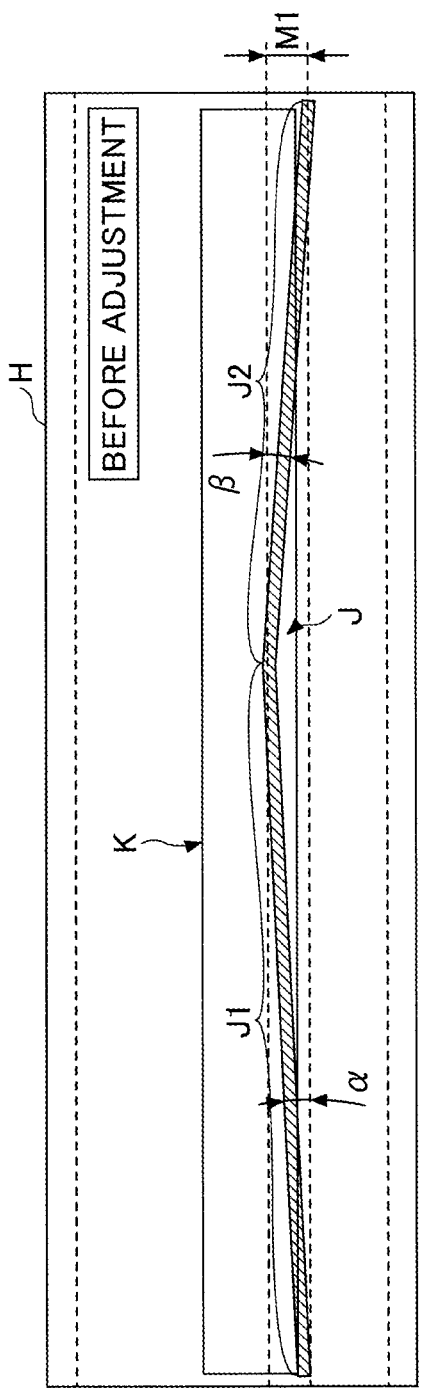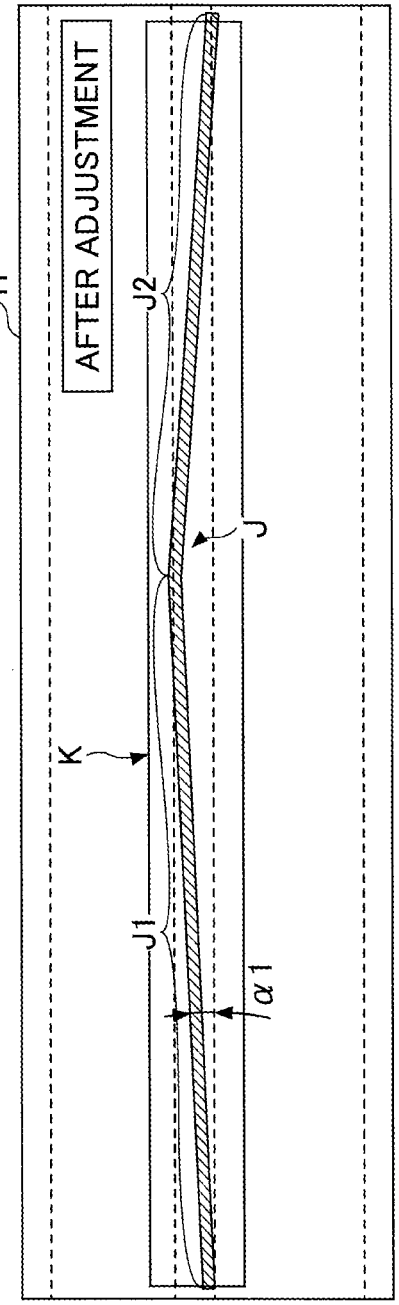
FIG.13A
FIG.13B

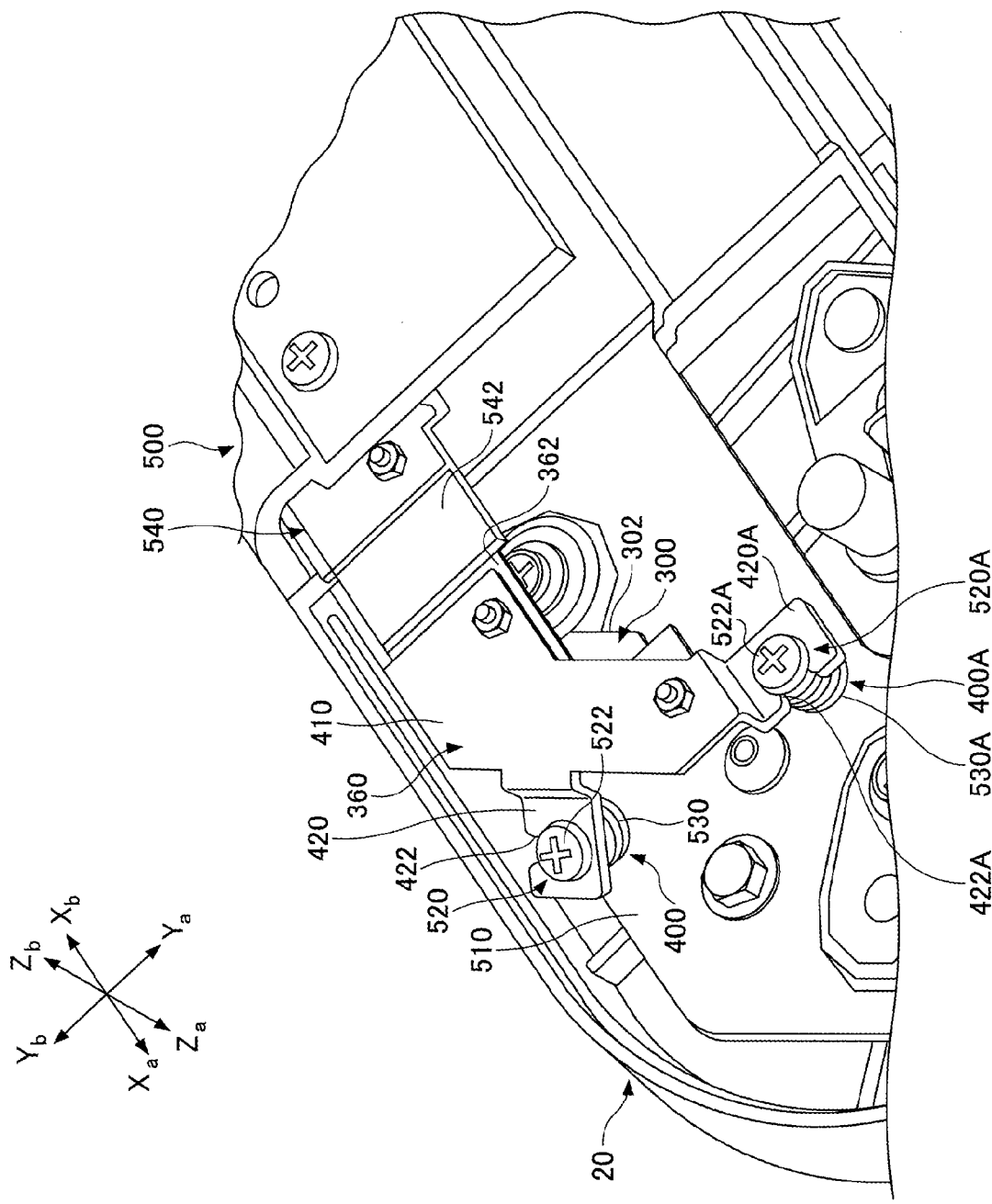

COORDINATE DETECTING DEVICE AND ELECTRONIC INFORMATION BOARD SYSTEM

CROSS-REFERENCE TO RELATED APPLICATIONS

The present application is based on and claims the benefit of priority under 35 U.S.C §119 of Japanese Patent Application No. 201.3-142394 filed Jul. 8, 2013, the entire contents of which are hereby incorporated herein by reference.

BACKGROUND OF THE INVENTION

1. Field of the Invention

The present invention generally relates to a coordinate detecting device and an electronic information board system.

2. Description of the Related Art

Recently, research and development has been conducted on an electronic information board a.k.a an electronic black board or an interactive white board. Such electronic information board typically has a mixed structure that includes an image display device, which has a large screen (e.g., a screen having a diagonal dimension of 40 to 60 inches) using a flat panel made of a liquid crystal panel or a plasma panel or the like, a touch panel (coordinate detecting device), which detects the coordinates of touched positions on the display surface of the image display device, and a control device which displays various images (i.e., images including characters, figures, or drawings) written on the display surface of the image display device based on coordinate data output from the coordinate detecting device (see, for example, Japanese Patent No. 4340302).

Further, when the electronic information board is connected with a personal computer, it becomes possible to enlarge and display an image displayed on the personal computer. This feature can be used for presentation in a conference, etc.

Further, in a system having such electronic information board ("electronic information board system"), when a pen-shaped input device (i.e., a target to be detected) is used to be in contact with the touch panel, it becomes possible to display a graphic image of hand-drawn characters which are written (by a user) with the pen-shaped input device to be overlapped with the image on the display surface. Also, it becomes possible for the electronic information board system to have a function to, for example, overwrite the graphic image of the hand-drawn characters written with the pen-shaped input device onto an image which is taken from the personal computer.

Further, the electronic information board system includes a coordinate detecting device. The coordinate detecting device includes two (a pair of) optical sensor units, which are provided in respective end corner sections formed in one side of a frame which surrounds four sides of a display section, and three optical reflecting members provided on the side walls orthogonal to the display surfaces of the remaining three sided of the frame, respectively.

In the coordinate detecting device, the mounting positions (attached positions) and the mounting angles (attached angles) of the optical sensor units are determined so that each light (infrared light) emitted from the optical sensor units can be radiated onto two optical reflecting members facing each other at a predetermined angle of the optical reflecting members provided on the three sides, and the reflected light from the optical reflecting members can be received by the optical sensor units.

Further, when the pen-shaped input device is in contact with the display surface, the light passing through the contact position is blocked so that the light cannot be received by the optical sensor units. Based on the angle of the light at that moment, the coordinate position is calculated (determined) using the triangulation method.

SUMMARY OF THE INVENTION

According to an aspect of the present invention, a coordinate detecting device to be used in an electronic information board system including a display section including a display surface with which a target to be detected is in contact and a frame having four sides surrounding the display surface, two optical sensor units disposed respectively at ends of one side of the display section and including respective light emitting and receiving surfaces to irradiate and receive light, and optical reflection members disposed at respective other three sides of the display section, so that a coordinate position where the target to be detected is in contact with the display surface is detected based on reflection light which is irradiated and received by the optical sensor units and reflected from the optical reflection members, includes: adjustment units adjusting the respective light emitting and receiving surfaces of the optical sensor units where the reflection light is irradiated and received, and impact absorption units absorbing impact applied to the respective optical sensor units.

BRIEF DESCRIPTION OF THE DRAWINGS

Other objects, features, and advantages of the present invention will become more apparent from the following description when read in conjunction with the accompanying drawings, in which:

FIG. 10 is a rear view of the sensor position adjustment mechanism according to the first embodiment;

FIGS. 13A and 13B are drawings illustrating example relative positions between a detected irradiation pattern and a control window before and after the sensor position adjustment according to the first embodiment;

FIG. 16 is a perspective rear view of the sensor position adjustment mechanism according to the second embodiment;

DETAILED DESCRIPTION OF THE PREFERRED EMBODIMENTS

Figure 1:
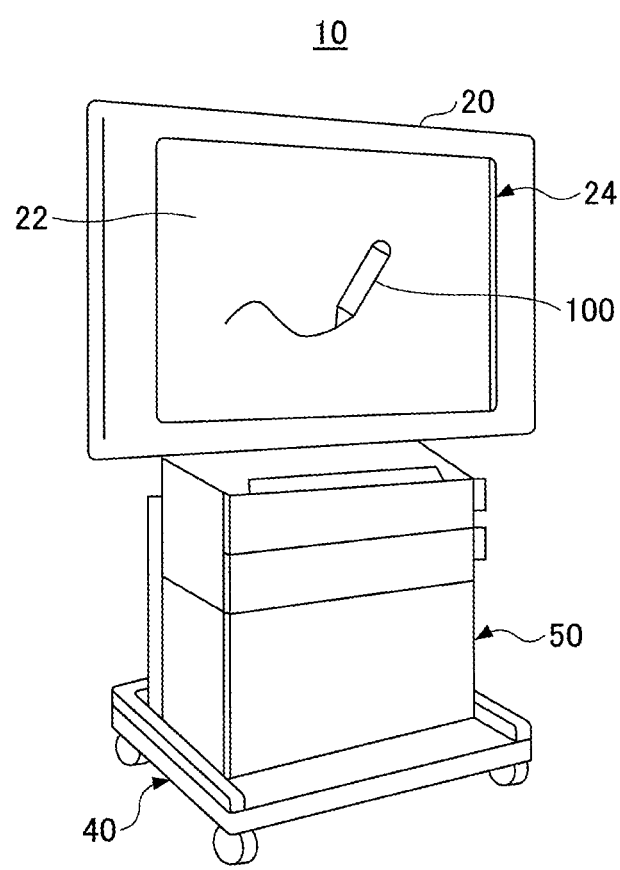
FIG. 1 is a perspective view of an electronic information board system including a coordinate detecting device according a first embodiment.

In related technologies, due to, for example, the vibration applied to an electronic information board system during transportation (shipment), the mounting position and the mounting angle of the optical sensors in the electronic information board system may be slightly changed. For example, as far as a 55-inch display device is concerned, a diagonal distance between each of the optical sensor units and the corresponding optical reflecting members is approximately 140 mm.

In the display device, if the mounting angle of the optical sensor unit is changed by one degree, the optical reach distance relative to the diagonally located optical reflecting members is changed (shifted) by 24 mm. As a result, a part of the light from the optical sensor units may be directed away from (out of) the optical reflecting members, which may prevent accurate coordinate detection in this area.

To resolve this problem, it may be thought that, for example, the height of the optical reflecting members (i.e., the width in the front-back direction relative to the vertical display surface) and the size of the optical sensor units are increased. In this case, however, the size of the bezel (cover member) surrounding the peripheral of the display part may also be increased.

Further, in related technologies, in a coordinate detecting device, a higher mounting accuracy of the optical sensor units is desired. Due to this, it is desired that the size accuracy of the parts used for the optical sensor units becomes higher and an additional process is desired to prevent the mounting positions of the optical sensor units from being changed during transportation so as to prevent the change of the mounting positions during transportation and the like. As a result, the production efficiency may be reduced and the production cost may be increased accordingly.

Further, when a pen-shaped input device is in strong contact with the display surface of the display section, the contact pressure relative to the display surface may be instantaneously increased. As a result, the contact pressure is transmitted (applied) to the display section as an impact force. At the same time, the impact force may be transmitted (applied) to the optical sensor units as well, so that the reflection light from the optical reflecting member may be directed out of the positions (area) of the light receiving surface of the optical sensor units.

As a result, the coordinate position at the moment when the pen-shaped input device is in contact with the display surface of the display section may not be detected, so that the input operation cannot be detected even when a user performs an input operation by using the pen-shaped input device to contact the display surface.

The present invention is made in light of the above problem and may provide a coordinate detecting device and an electronic information board system which resolve the above problem.

According to an embodiment, even when, for example, the position of the optical sensor is changed due to a strong contact of the pen-shaped input device to the display surface, it becomes possible that an adjustment means (mechanism) can adjust the light emitting and receiving surface of the optical sensor unit receiving the reflection light so that the optical sensor unit can correctly receive the reflection light from light reflection members. Further, even when an impact is applied to the optical sensor unit, an impact absorption means (mechanism) can absorb the impact so as to prevent the displacement of the position of the optical sensor unit and the optical sensor unit can accurately receive the reflection light from the light reflection members.

In the following, embodiments of the present invention are described with reference to the accompanying drawings.

First Embodiment

FIG. 1 is a perspective view of an electronic information board system using a pen-shaped input device according to a first embodiment. As illustrated in FIG. 1, an electronic information board system 10 includes a display section 20, a stand 40, and a device storage section 50.

The display section 20 is made of a flat panel such as a liquid crystal panel, a plasma panel or the like. Further, in the front surface of the body of the display section 20, there are provided (formed) a display surface 22, which displays an image, and a coordinate detecting device (touch panel) 24.

Further, in the electronic information board system 10, it is possible to write (input) characters, a figure, etc., on the display surface 22 by causing the pen nib (pen point) of the pen-shaped input device to contact the display surface 22.

When the pen nib of a pen-shaped input device 100 is in contact with the display surface 22, the pen-shaped input device 100 transmits, as a wireless signal, a detection signal of a transcription. Then, upon receiving the transcription detection signal from the pen-shaped input device 100, the display section 20 displays, as a graphic, the characters, the figure and the like which are written on the coordinate positions which are detected by the coordinate detecting device (touch panel) 24.

Further, when the pen tail (the part opposite to the pen nib) of the pen-shaped input device 100 is in contact with the display surface 22, the pen-shaped input device 100 transmits, as a wireless signal, a detection signal of a deletion. Then, upon receiving the deletion detection signal from the pen-shaped input device 100, the display section 20 displays an image in which the characters, the figure and the like, which are written at the coordinate positions detected by the coordinate detecting device (touch panel) 24, are deleted on the display surface 22.

The device storage section 50 stores various apparatuses such as a controller (described below), a printer, and a video disk apparatus and the like. Further, on the upper surface of the device storage section 50, there is a keyboard (not shown) for input operations.

Method of Detecting Coordinates in Coordinate Detecting Device 24

Figure 2:
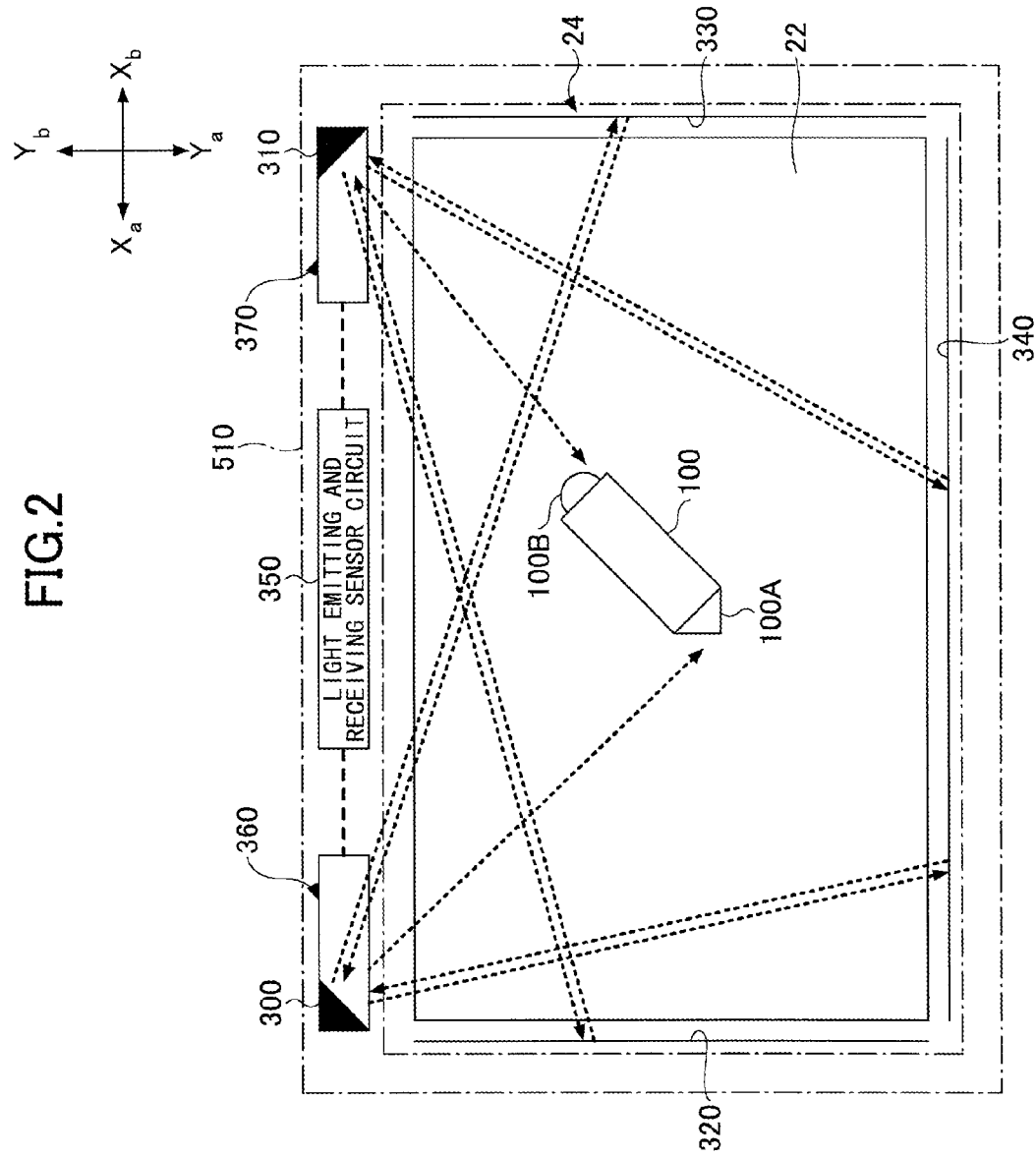
FIG. 2 schematically illustrates an example configuration of the coordinate detecting device according to the first embodiment.

FIG. 2 illustrates an example configuration of the coordinate detecting device 24 according to the first embodiment which detects coordinate positions. As illustrated in FIG. 2, the coordinate detecting device 24 includes first and second optical sensor units 360 and 370, which are mounted (provided) on a side wall corresponding to one side which is the upper side of a frame 510 (which is illustrated in dashed-dotted lines of FIG. 2).

The coordinate detecting device 24 further includes reflection plates 320, 330, and 340 which are mounted on (attached to) the respective three sides which are other than the above one side among the four sides of the frame 510. Here, the frame 510 is formed in a square shape so as to surround the four sides of the display surface 22 of the display section 20.

The first and second optical sensor units 360 and 370 are provided on the left and right corner parts, respectively, and the front side of the one side (upper side) of the display surface 22. Further, the first and second optical sensor units 360 and 370 include first and second light emitting and receiving sensors 300 and 310, respectively.

Further, the first and second optical sensor units 360 and 370 are provided in a manner such that the light emitting direction of the first and second light emitting and receiving sensors 300 and 310 can be adjusted by a sensor position adjustment mechanism 400 described below (see FIG. 5).

The reflection plates ("light reflection members") 320, 330, and 340 are provided on the three sides (i.e., left, right, and bottom sides) other than the one side (upper side) of the display surface 22.

Further, the reflection plates 320, 330, and 340 are formed in a manner that the reflection plates 320, 330, and 340 protrude to the front side with respect to the display surface 22 from the edge parts of the left, right, and bottom sides, respectively. Further, the reflection plates 320, 330, and 340 are formed in a straight manner in X or Y direction in a manner that the width of the reflection plates 320, 330, and 340 in the protruding direction (i.e., on the front side) from the display surface 22 is in a range from 7 mm to 10 mm.

Due to this structure, when there exists a target to be detected such as the pen-shaped input device 100 in the plane between the first and second light emitting and receiving sensors 300 and 310 and the reflection plates 320, 330, and 340 (on the display surface 22), the reflection light at the coordinate position corresponding to the position of the target to be detected cannot be received.

The first light emitting and receiving sensor 300, which is provided (disposed) on the left upper corner part of the display section 20, irradiates infrared light, as coordinate detecting light, to the surfaces vertical to the display surface 22. Specifically, the infrared light irradiated from the first light emitting and receiving sensor 300 is directed to all areas of the right-side reflection plate 330 and the bottom-side reflection plate 340.

On the other hand, the second light emitting and receiving sensor 310, which is provided (disposed) on the right upper corner part of the display section 20, irradiates infrared light, as coordinate detecting light, to the surfaces vertical to the display surface 22. Specifically, the infrared light irradiated from the second light emitting and receiving sensor 310 is directed to all areas of the left-side reflection plate 320 and the bottom-side reflection plates 340.

When nothing is in contact with the display surface 22, all the infrared light from the first and second light emitting and receiving sensors 300 and 310 are reflected by the reflection plates 320, 330, and 340, and all the reflection light can be received by the first and second light emitting and receiving sensors 300 and 310.

When a pen nib 100A or a pen tail 100B of the pen-shaped input device 100 (the target to be detected) is in contact with the display surface 22, the infrared light irradiated from the first and second light emitting and receiving sensors 300 and 310 is blocked at the contact position. Due to this, a light emitting and receiving sensor circuit (calculation unit) 350 detects (calculates) a tilt angle relative to the horizontal direction at the position where the infrared light is blocked, calculates the coordinate position of the blocked position by using a triangulation method, and converts the position into XY coordinates.

Then, a signal indicating the coordinate position acquired by the light emitting and receiving sensor circuit 350 is transmitted to a controller 60 described below.

Figure 3:
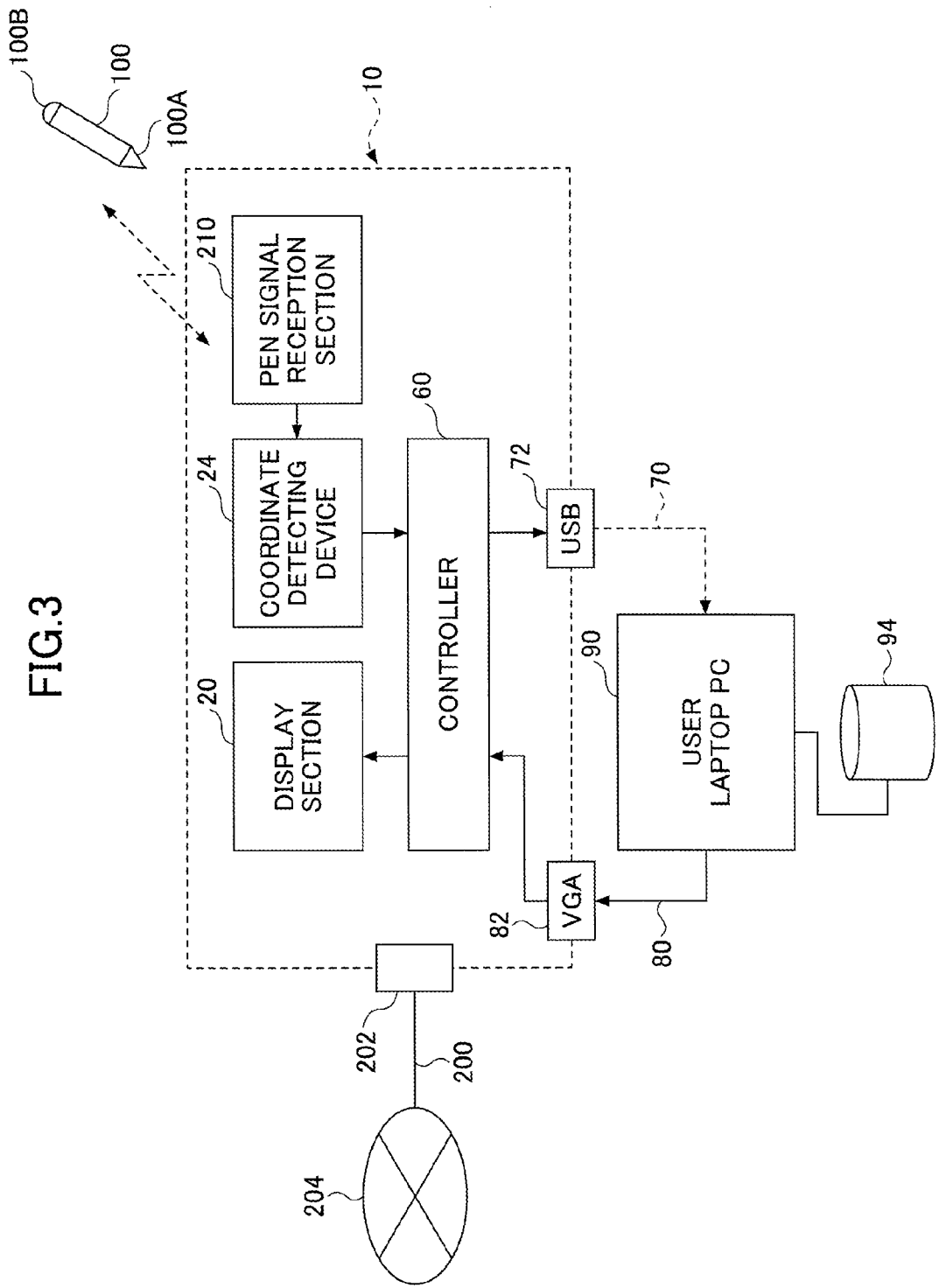
FIG. 3 is schematically illustrates an example main part of the electronic information board system according to the first embodiment.

FIG. 3 is a block diagram of an example configuration of a control system of the electronic information board according to the first embodiment. As illustrated in FIG. 3, the display section 20 is controlled by the controller 60, so that an image taken from a personal computer 90 is displayed on the display surface 22.

Further, the controller 60 includes a Universal Serial Bus (USB) port 72, to which a USB cable 70 is connected, and a video input socket 82 to which a video socket cable 80 is connected. Here, the video socket cable includes, for example, a cable for the Video Graphic Array (VGA) port, a cable for the High-Definition Multimedia Interface (HDMI) (registered trademark) port, and a cable for a Display port.

The user Personal Computer (PC) 90 is connected with the controller 60 via the USB port 72 and the video input socket 82. Further, the user PC 90 includes a storage 94 including a disk storage device. The storage 94 stores various contents and programs such as application software to display the contents, so that when a user (operator) selects desired contents from the contents stored in the storage 94, the contents can be displayed on the PC monitor.

Therefore, upon receiving image data of the image displayed on the monitor of the user PC 90 via the USB cable 70 and the video socket cable 80, the controller 60 controls so as to display an image on the display surface 22 of the display section 20, the image being the same as the image data of the image displayed on the PC monitor.

The controller 60 further includes a network socket 202 to which a communication line 200 such as an optical fiber is connected, so as to be connected with a network 204 such as the Internet, a Local Area Network (LAN), etc., via the network socket 202.

Further, the electronic information board system 10 includes a pen signal reception section 210 that receives the detection signal transmitted from the pen-shaped input device 100. Upon receipt of the detection signal transmitted from the pen-shaped input device 100, the pen signal reception section 210 inputs the detection signal into the coordinate detecting device (touch panel) 24.

By doing this, the coordinate detecting device 24 can recognize that the input operation using the pen-shaped input device 100 is performed and outputs a signal indicating the receipt of the detection signal to the controller 60.

Control System of the Electronic Information Board

Figure 4:
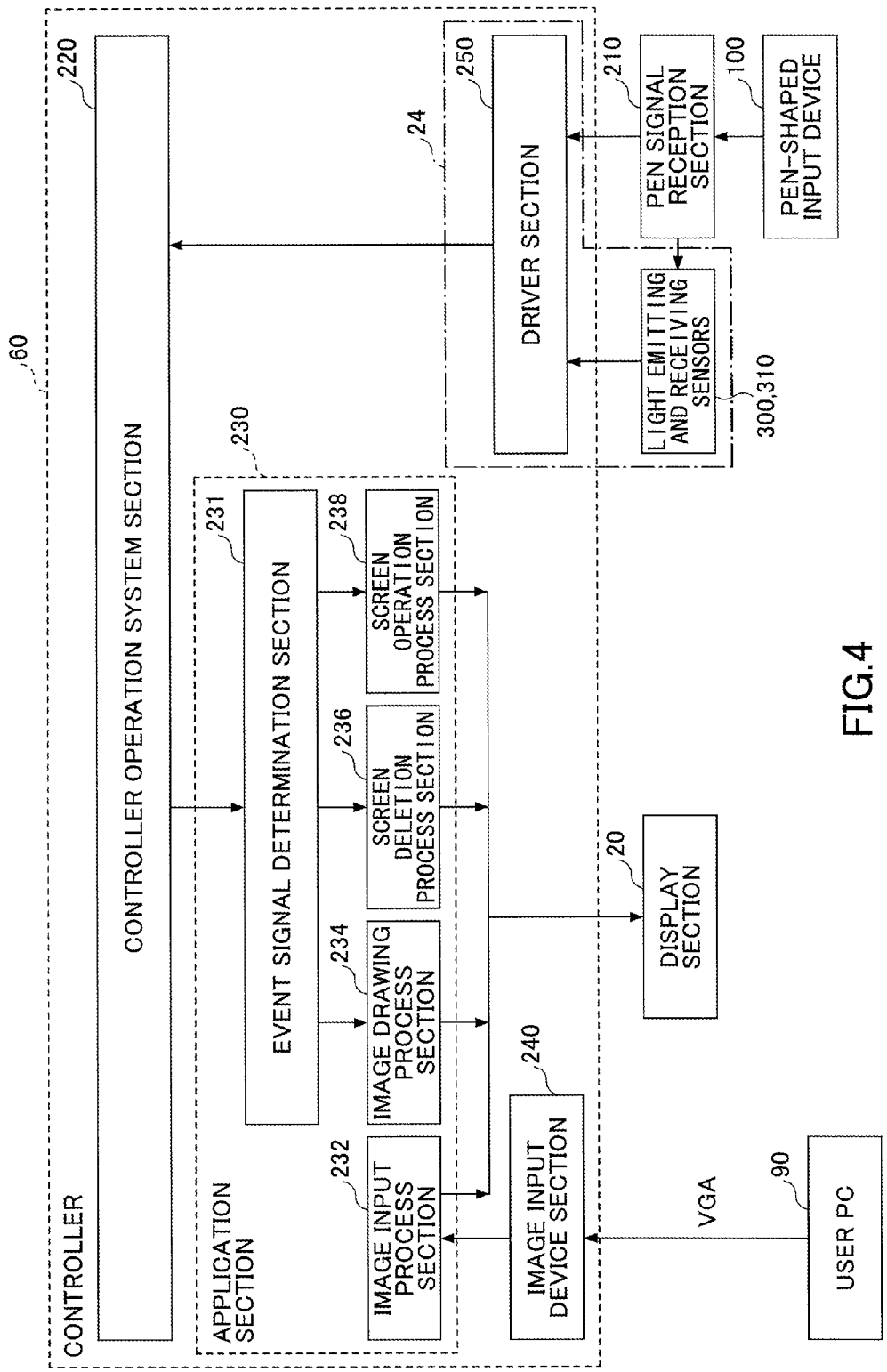
FIG. 4 illustrates an example configuration of a controller of an electronic information board according to the first embodiment.

FIG. 4 is a block diagram of an example configuration of the controller 60 of the electronic information board according to the first embodiment. As illustrated in FIG. 4, the controller 60 of the electronic information board includes the pen signal reception section 210, a control operation system section 220, an application section 230, an image input device section 240, and a driver section 250 of the coordinate detecting device 24.

Further, the application section 230 includes an event signal determination section 231, an image input process section 232, an image drawing process section 234, a screen deletion process section 236, and a screen operation process section 238.

The control operation system section 220 is a main control section that manages and controls the control process that the controller 60 performs.

The application section 230 performs a control process to generate a whole screen to be displayed on the display surface 22 of the display section 20, a control process to display the image, which is output from the user PC 90, on the display surface 22, and a control process to, when the transcription detection signal is detected due to the contact of the pen-shaped input device 100 to the display surface 22 of the display section 20, display the drawing and characters written at the contact position.

The event signal determination section 231 monitors an event signal which is input from the control operation system section 220, and performs a control process corresponding to the input event signal.

The image input process section 232 performs a process to display the image, which is input from the user PC 90, on the display surface 22.

The image drawing process section 234 generates a hand-drawn graphic (image) based on the coordinate position data which are input from the coordinate detecting device 24 via the event signal determination section 231, superimposes the hand-drawn graphic on the already-displayed image, and displays the superimposed image on the display surface 22 of the display section 20.

The screen deletion process section 236 generates a graphic using a background color of the currently-displayed image based on the information indicating the coordinate position input from the coordinate detecting device 24 via the event signal determination section 231, superimposes the graphic of the background color on the already-displayed image, and displays the superimposed image on the display surface 22 of the display section 20.

By doing this, the graphic of the background color is superimposed on the already-displayed image, so that it appears that the hand-drawn graphic is deleted on the display surface 22.

The screen operation process section 238 convers the information (signal) indicating the coordinate position, which is input from the coordinate detecting device 24 via the event signal determination section 231, into a pointing device signal of a mouse event and the like, and performs a process by an on/off operation of a screen operation section displayed on the display surface 22 of the display section 20.

Further, the screen operation process section 238 transmits information indicating the coordinate position, as a mouse down event, along with the coordinate value to the controller operation system section 220, the information indicating the coordinate position being detected by the first and second light emitting and receiving sensors 300 and 310 of the coordinate detecting device 24 and being where the pen-shaped input device 100 contacts the display surface 22.

Further, when the pen-shaped input device 100 is moved while the pen-shaped input device 100 is in contact with the display surface 22 of the coordinate detecting device 24, the screen operation process section 238 transmits the information indicating the corresponding coordinate positions, as a mouse up event along with the coordinate values to the controller operation system section 220.

The driver section 250 converts a signal indicating the coordinate position ("coordinate position signal") input from the pen-shaped input device 100 and the coordinate detecting device 24 and the transcription detection signal or the deletion detection signal into a predetermined event signal, and transmits the predetermined event signal to the controller operation system section 220.

Further, when the pen signal reception section 210 receives the transcription detection signal or the deletion detection signal from the pen-shaped input device 100, the driver section 250 transmits the transcription detection signal or the deletion detection signal along with the coordinate position signal to the controller operation system section 220.

Configuration of the Sensor Position Adjustment Mechanism

Figure 5:
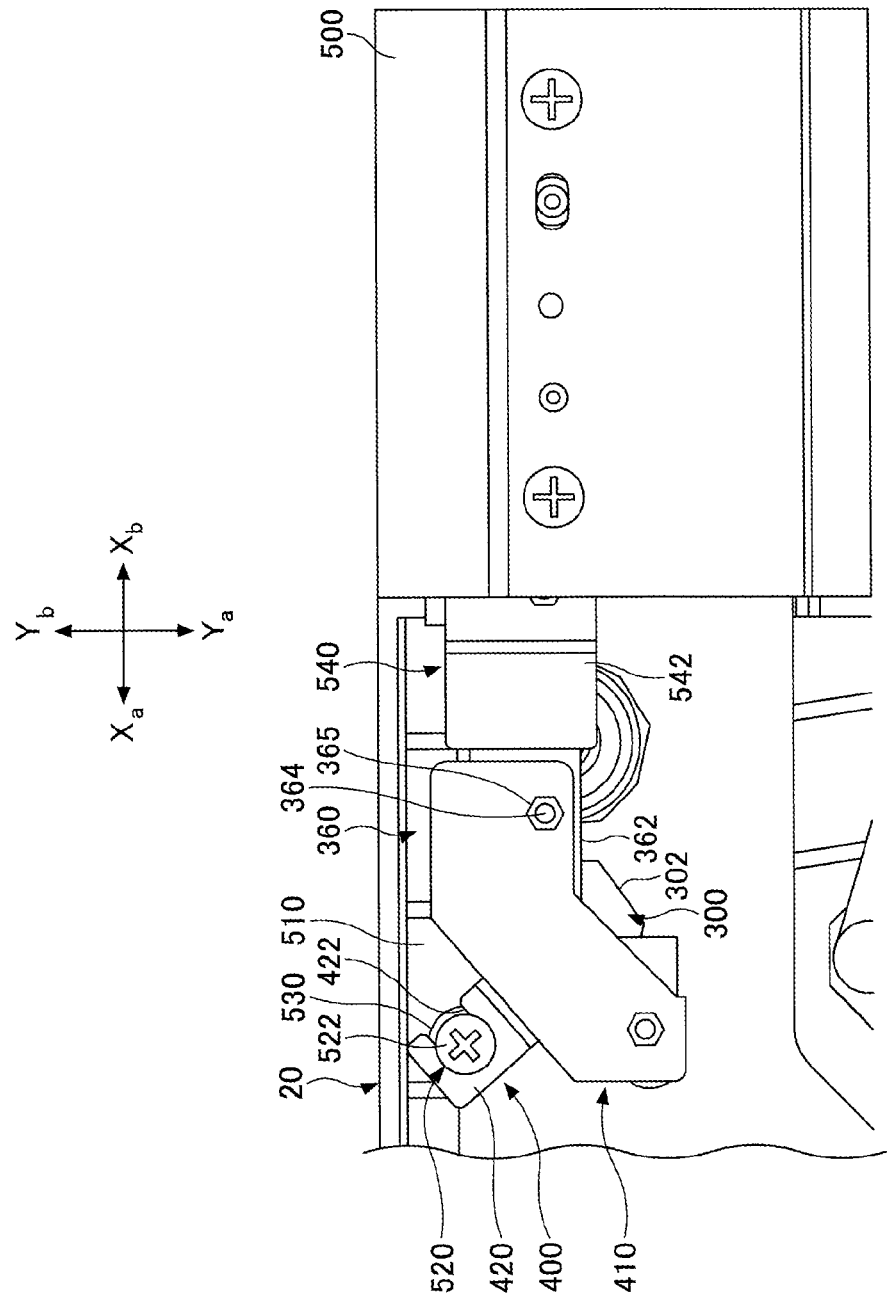
FIG. 5 illustrates an example sensor position adjustment mechanism provided at a corner part of a display section according to the first embodiment.
Figure 6:
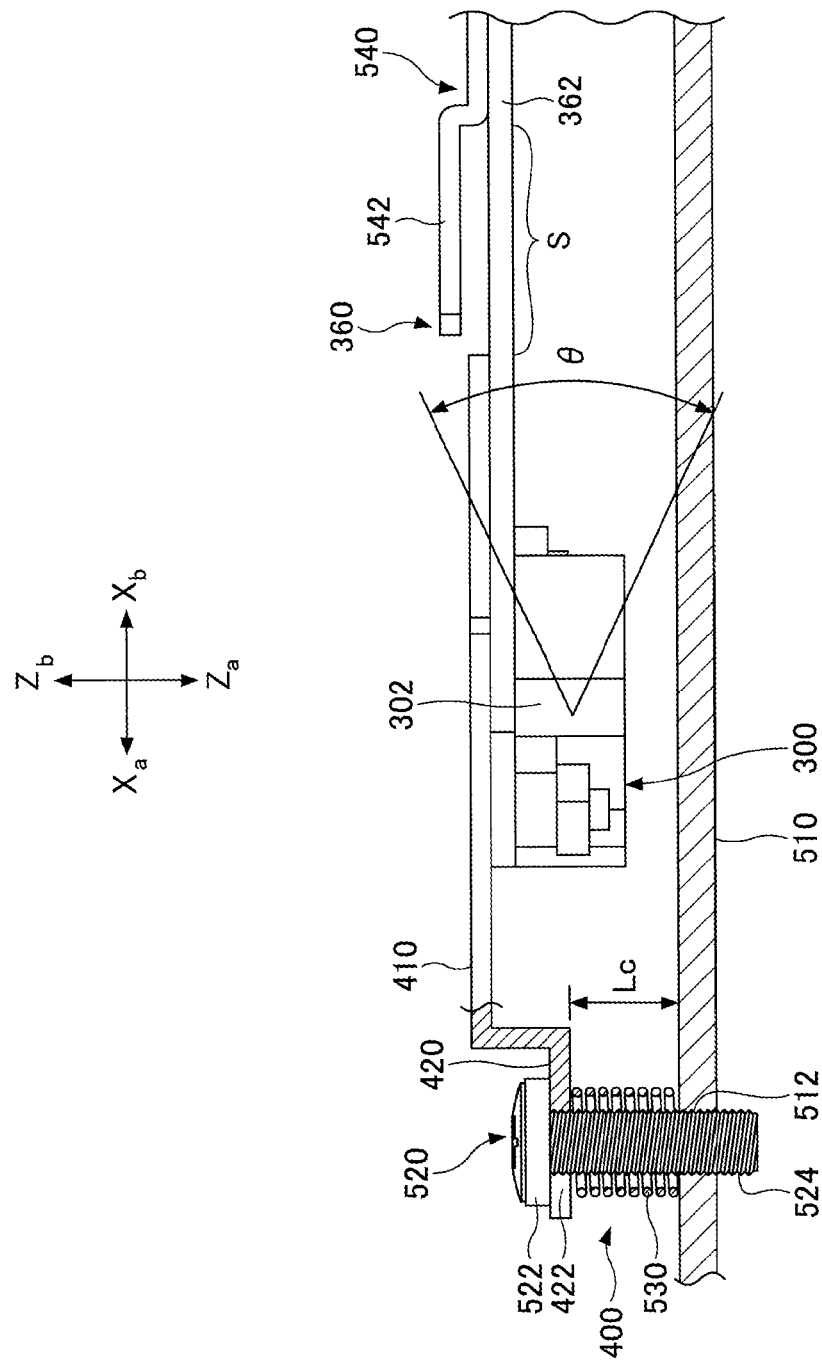
FIG. 6 is a bottom view of the sensor position adjustment mechanism according to the first embodiment.
Figure 7:
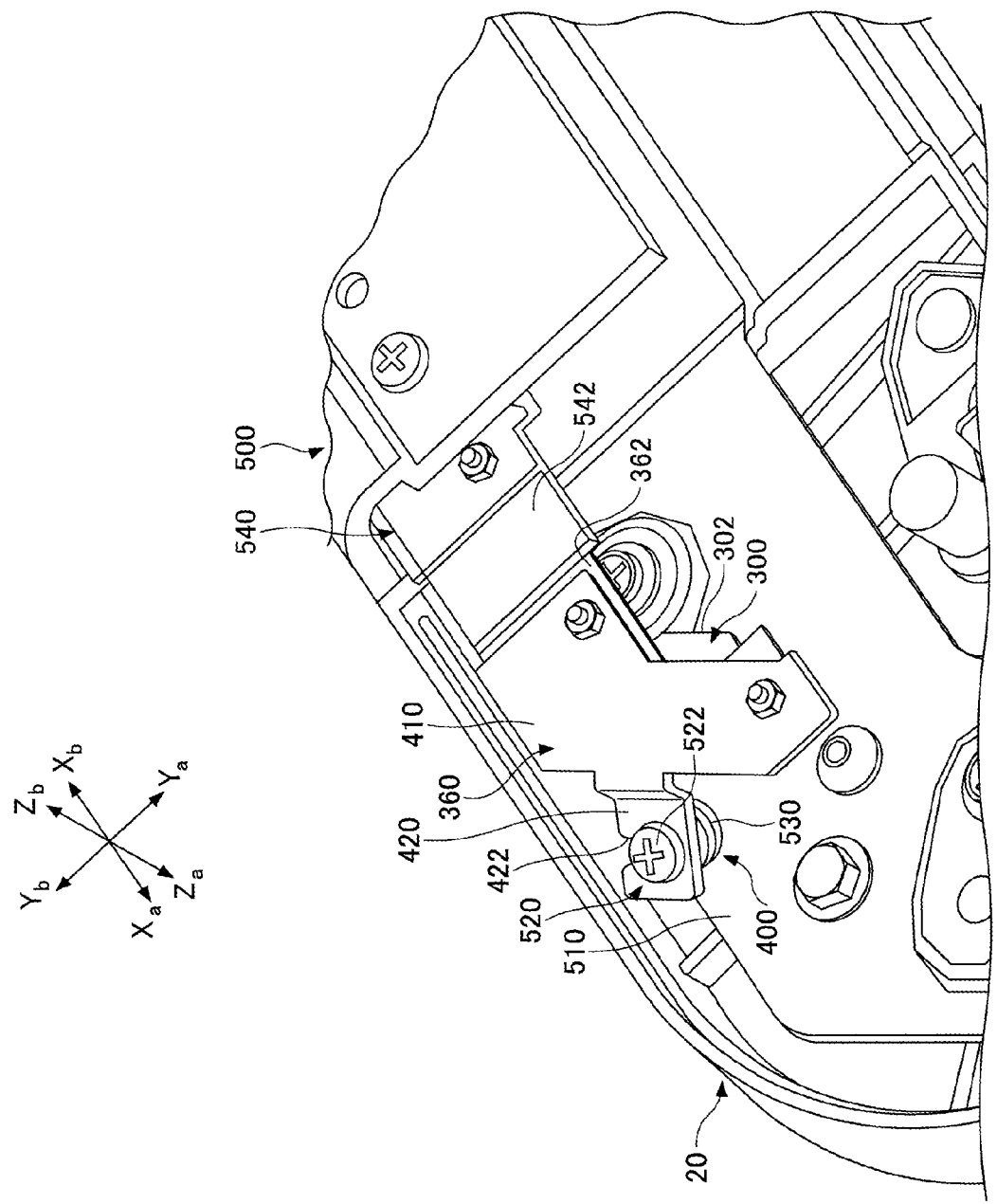
FIG. 7 is a perspective rear view of the sensor position adjustment mechanism according to the first embodiment.

FIG. 5 illustrates a sensor position adjustment mechanism 400 provided on a corner part of the display section 20 according to the first embodiment. FIG. 6 is a bottom view of the sensor position adjustment mechanism according to the first embodiment. FIG. 7 is a perspective rear view of the sensor position adjustment mechanism according to the first embodiment.

Here, the first and second optical sensor units 360 and 370 are symmetrically provided on respective rear corner parts of the display section 20. Therefore, in the following description, only the sensor position adjustment mechanism 400 of the first optical sensor unit 360 is described.

As illustrated in FIGS. 5 through 7, the sensor position adjustment mechanism 400 which is for adjusting the irradiation direction and the receiving direction of the infrared light of the first light emitting and receiving sensor 300 is provided on the rear left corner part of the display section 20.

Here, the sensor position adjustment mechanism 400 is disposed inside a housing 500 of the display section 20. In FIGS. 5 through 7, for explanatory purposes, a case is described where the exterior cover (see FIG. 12) at the corner part of the housing 500 is removed so that the sensor position adjustment mechanism 400 is exposed.

In the manufacturing process of the first optical sensor unit 360, the first optical sensor unit 360 is mounted in a manner that a light emitting and receiving surface 302 of the first light emitting and receiving sensor 300 and the irradiation direction of the infrared light from the light emitting and receiving surface 302 are set based on the respective predetermined directions relative to the reflection plates 330 and 340.

Here, the sensor position adjustment mechanism 400 is the adjustment means (mechanism) for fine adjustment of the height direction (Z direction) of the light emitting and receiving surface 302 in a case where the attached position of the first light emitting and receiving sensor 300 is changed (shifted) due to vibration caused by a strong force applied when, for example, the pen-shaped input device 100 is in strong contact with the display surface 22 of the display section 20.

The sensor position adjustment mechanism 400 includes a position adjustment bracket 410, a screw insertion section 420, and an adjustment screw member 520 (first adjustment means (mechanism)). The position adjustment bracket 410 is fixed to the rear surface on the head side (i.e., end part in Xa direction) of a print board 362 of the first optical sensor unit 360. The screw insertion section 420 protrudes in the diagonal direction of the display section 20 from the middle part of the position adjustment bracket 410. The adjustment screw member 520 is an adjustment means (mechanism) that is inserted through the screw insertion section 420.

In side view, the screw insertion section 420 of the position adjustment bracket 410 is bent in a crank shape so that the position of the screw insertion section 420 in the Z direction corresponds to the center of the Z direction of the first light emitting and receiving sensor 300. Further, the position adjustment bracket 410 is integrated with the print board 362 with nuts 365 into which screw fixing members 364 (FIG. 5) are screwed at two parts (points) on the rear surface of the print board 362 of the first optical sensor unit 360.

Further, the base end side of the print board 362 (i.e., the end part in Xb direction) is fastened to a fixing bracket 540 so as to be fixed to a frame 510 of the display section 20 via the fixing bracket 540. Therefore, the base end side (i.e., the end part in Xb direction) of the print board 362 is fastened to the fixing bracket 540 so that the head side (i.e., the end part in Xa direction) of the print board 362 is displaceable in the front-back direction (Za-Zb direction) like a cantilever.

Further, the fixing bracket 540 includes a relief part 542 to form a fine clearance from the head side (i.e., the end part in Xa direction) of the print board 362. Further, between the position adjustment bracket 410 and the relief part 542 of the fixing bracket 540, the print board 362 includes an elastic deformation area "S" (see FIG. 6) whose displacement (movement) is not restricted by the position adjustment bracket 410 and the fixing bracket 540. The elastic deformation area "S" of the print board 362 can be bent in Za and Zb directions based on the rotational operation of the adjustment screw member 520, so as to function as a hinge in the sensor position adjustment.

As illustrated in FIG. 6, the adjustment screw member 520 is screwed in the horizontal direction (Za direction) orthogonal to the frame 510 extendedly formed in the vertical direction. Further, the adjustment screw member 520 includes a head part 522 on the rear side of the display section 20 and a screw part 524 which is screwed into a screw hole 512 of the frame 510 disposed on the front side (Za direction) of the screw insertion section 420.

When the head part 522 of the adjustment screw member 520 is rotated in the tightening direction (clockwise direction) with a tool such as a screw driver, the screw insertion section 420 of the position adjustment bracket 410 is displaced (moved) in the front direction (Za direction) so as to be adjusted in the manner that the distance "Lc" (see FIG. 6) is reduced.

Further, there is a coil spring (elastic member) 530 between the screw insertion section 420 and the frame 510. The coil spring 530 presses the screw insertion section 420 in Zb direction so that the screw insertion section 420 is to be separated from the frame 510. Due to this, even in a case where an impact is applied to the first optical sensor unit 360 when the pen-shaped input device 100 is in strong contact with the display surface 22 of the display section 20, the impact can be absorbed by the coil spring 530 (impact absorption means (mechanism)). By having the structure described above, it becomes possible to prevent the position displacement of the first optical sensor unit 360 and accurately receive the reflection light from the reflection plates 320, 330, and 340 (optical reflection members).

In place of the coil spring 530, an elastic member such as a torsion spring, a leaf spring, etc. or a dumper member such as rubber, an air spring, etc. may be used.

On the other hand, when the head part 522 of the adjustment screw member 520 is rotated in the loosening direction (counter-clockwise direction) with the tool such as the screw driver, the pressing force of the screw insertion section 420 to the frame 510 side is loosened (reduced). Therefore, the screw insertion section 420 is displaced in the rear direction (Zb direction) due to the pressing force (spring force) of the coil spring 530, so as to be adjusted in the manner that the distance "Lc" (see FIG. 6) is increased.

As described, by rotating the head part 522 of the adjustment screw member 520, the screw insertion section 420 of the position adjustment bracket 410 is displaced in Za and Zb directions and the end part of the print board 362 of the first optical sensor unit 360 to which the position adjustment bracket 410 is fixed is also displaced in Za and Zb directions.

In this case, in the first light emitting and receiving sensor 300 of the first optical sensor unit 360, the light emitting and receiving surface 302, which serves as the irradiation surface and receiving surface of light, is directed obliquely downward at tilted angle of 45 degrees.

Further, as illustrated in FIG. 5, the screw insertion section 420 and the adjustment screw member 520 are provided on the left upper side (in the orthogonal direction) of the first light emitting and receiving sensor 300, and the right end part of the position adjustment bracket 410 is provided on the right upper side of the first light emitting and receiving sensor 300. Therefore, as illustrated in FIG. 6, when the screw insertion section 420 of the position adjustment bracket 410 is displaced in Za and Zb directions, the direction of the light emitting and receiving surface 302 of the first light emitting and receiving sensor 300 of the first optical sensor unit 360, that is, the angle "θ" of the irradiation direction of the infrared light, can be adjusted.

The adjustment direction of the angle "θ" is the width direction (Za and Zb directions) orthogonal to the extending direction of the reflection plates 320, 330, and 340 of the coordinate detecting device 24. Therefore, based on the angle "θ", the infrared light from the first light emitting and receiving sensor 300 may be directed inside the reflection plates 320, 330, and 340 (Za direction) or may be direction outside the reflection plates 320, 330, and 340 (Zb direction).

Configuration of the First Optical Sensor Unit 360

Figure 8A:
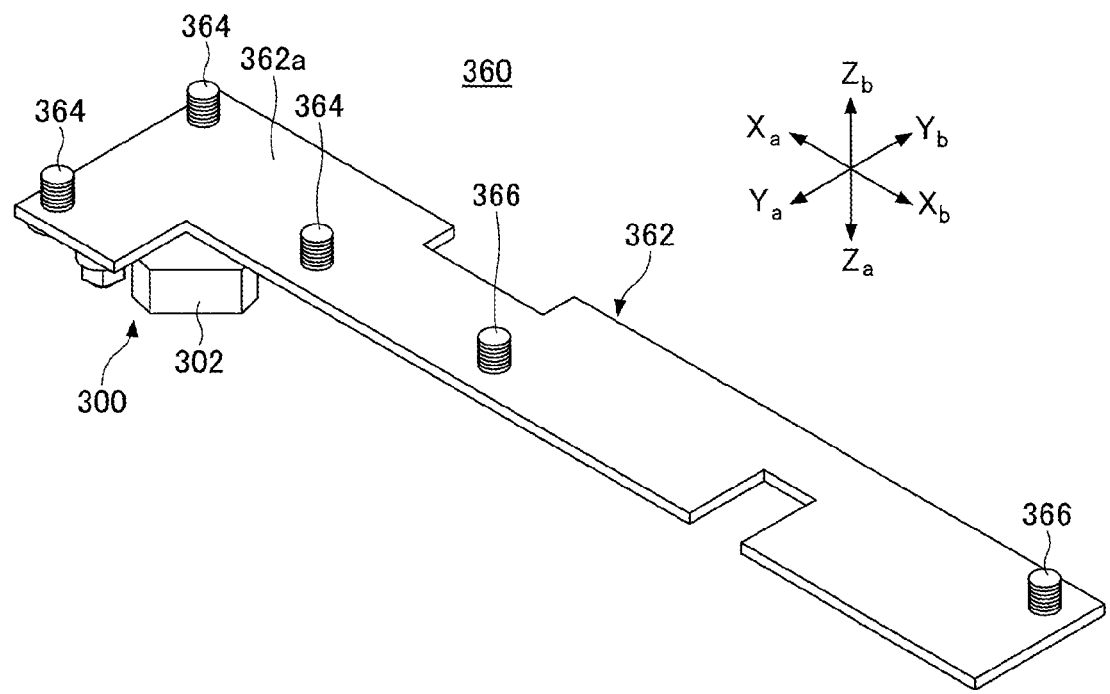
FIGS. 8A and 8B are perspective views of an example configuration of an optical sensor unit according to the first embodiment.
Figure 8B:
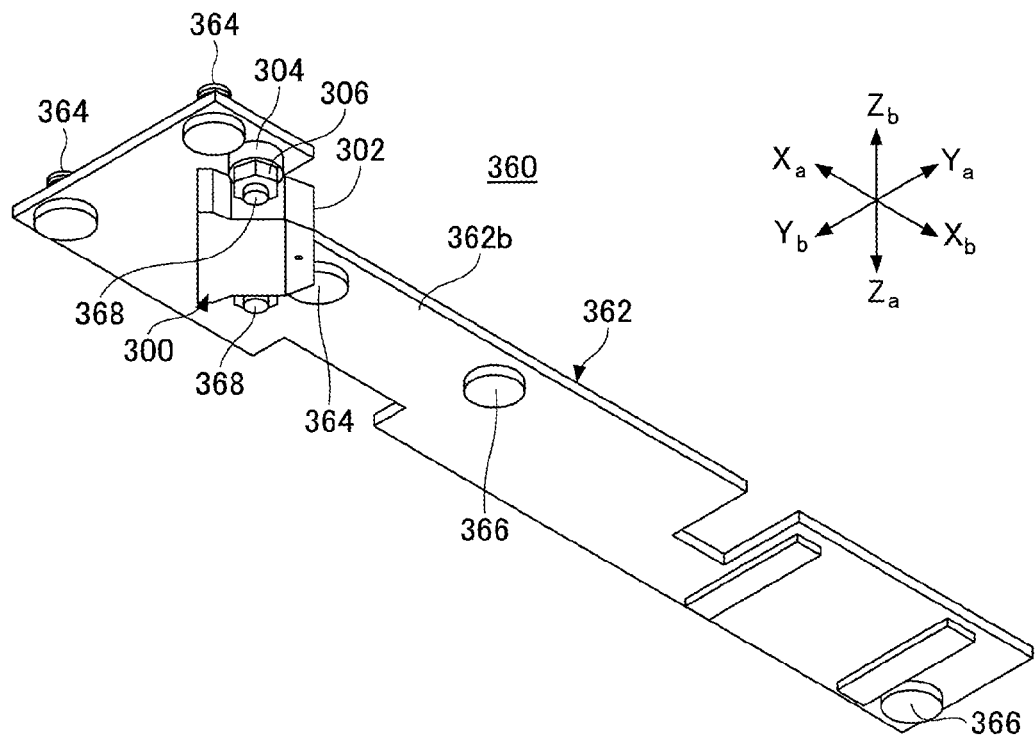

FIGS. 8A and 8B are perspective views of an example configuration of the first optical sensor unit 360 according to the first embodiment. As illustrated in FIGS. 8A and 8B, the first optical sensor unit 360 includes the print board 362 and the first light emitting and receiving sensor 300 which is mounted on the lower surface 362b on the head side of the print board 362.

The print board 362 includes wire patterns formed on the surface thereof and a plurality of electronic parts mounted thereon to, for example, generate a control signal to irradiate the infrared light from the first light emitting and receiving sensor 300 and process the detection signal upon receipt of the reflection light.

Further, the print board 362 is made of an insulation material such as an epoxy resin or the like. Therefore, the elastic deformation area "S" (see FIG. 6) of the print board 362, whose displacement (movement) is not restricted by the position adjustment bracket 410 and the fixing bracket 540, is elastically displaced when the head part 522 of the adjustment screw member 520 is rotated in Za or Zb direction to apply suppress strength (a pressing force).

There are three bracket bolts 364 standing on the head side of the upper surface 362a of the print board 362. Further, there are two bracket bolts 366 standing on the base end side of the upper surface 362a of the print board 362. Further, there are two sensor bolts 368 standing on the lower surface 362b of the print board 362.

Further, the first light emitting and receiving sensor 300 includes a fastening part 304 on both sides thereof. The fastening parts 304 of the first light emitting and receiving sensor 300 are fastened to the print board 362 by the tightening of the nuts 306 which are screwed onto the sensor bolts 368 of the print board 362. Namely, the first light emitting and receiving sensor 300 is integrated with the print board 362, so that the irradiation direction of the infrared light relative to the print board 362 is determined to be the same as a predetermined direction.

Figure 9A:
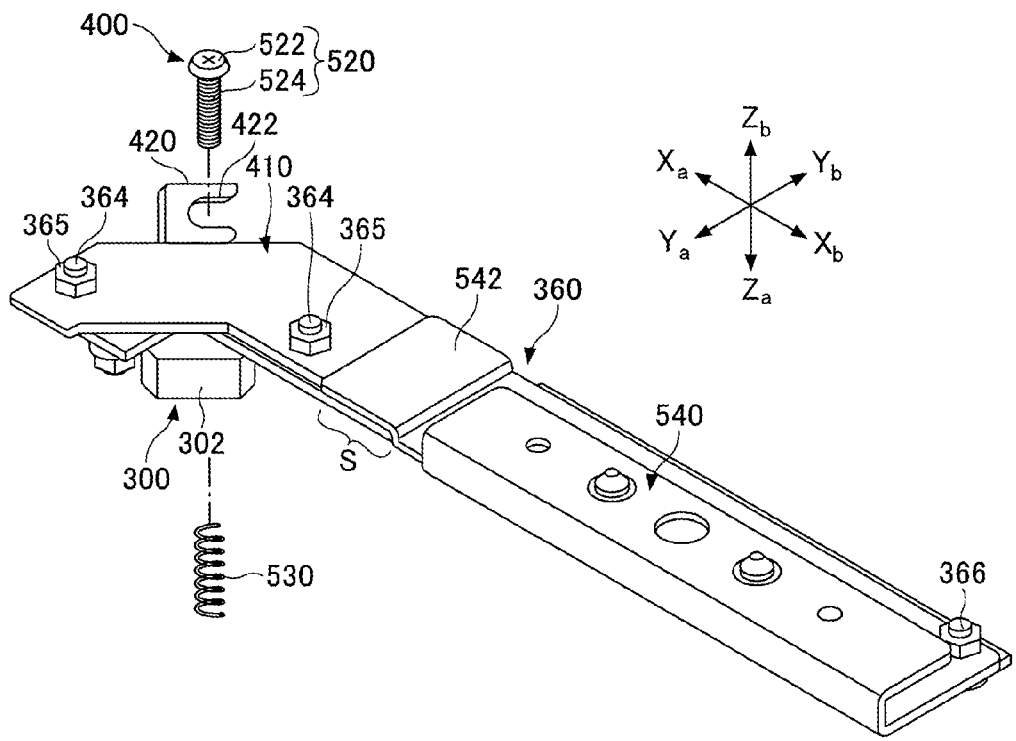
FIGS. 9A and 9B are perspective views of an example supporting structure of the optical sensor unit according to the first embodiment.
Figure 9B:
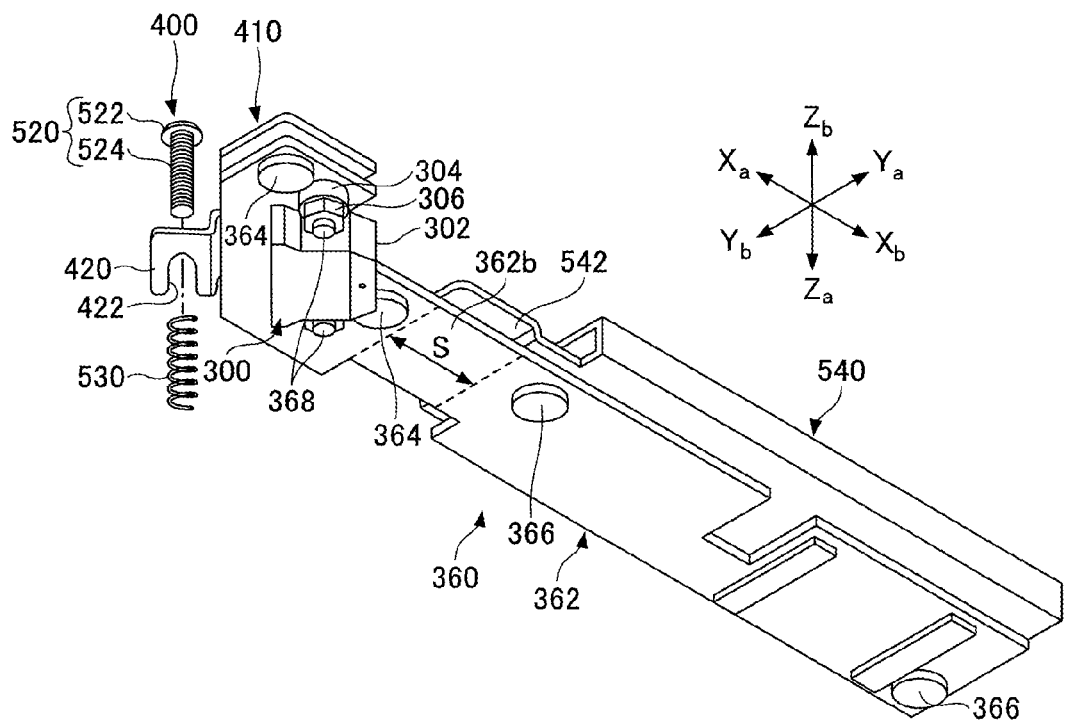

FIGS. 9A and 9B are perspective views of an example supporting structure of the first optical sensor unit 360 according to the first embodiment. As illustrated in FIGS. 9A and 9B, in the first optical sensor unit 360, the position adjustment bracket 410 is fastened to the upper surface 362a of the print board 362 with the nuts 365, for fastening the position adjustment bracket 410, which are screwed onto the respective two bracket bolts 364 standing on the head side of the upper surface 362a of the print board 362. Due to the structure where the whole lower surface of the position adjustment bracket 410 is in contact with and fastened to the upper surface 362a of the print board 362, the position adjustment bracket 410 functions as a supporting member to reinforce the head part of the print board 362 as well.

The screw insertion section 420 protrudes from the head part of the position adjustment bracket 410 in the diagonal direction (middle of Xa and Yb directions (in a 45 degree direction)) and includes a U-shaped groove 422 formed thereon so as to insert the adjustment screw member 520 therethrough. The adjustment screw member 520 has the head part 522 having a greater diameter than that of the U-shaped groove 422 so that, when the screw part 524 of the adjustment screw member 520 is inserted through the U-shaped groove 422 and screwed into the screw hole 512, the head part 522 of the adjustment screw member 520 is in contact with the screw insertion section 420. In this state, the coil spring 530 is in contact with the lower side (surface) of the screw insertion section 420.

By having this structure, by rotating the head part 522 of the adjustment screw member 520, the screw insertion section 420 can be displaced (moved) in Za or Zb direction so as to adjust (change) the direction of the light emitting and receiving surface 302 of the first light emitting and receiving sensor 300 in Z direction.

Further, the elastic deformation area "S", which can be elastically displaced in the sensor position adjustment, is disposed between the position adjustment bracket 410, which is made of metal and fastened to the print board 362, and the fixing bracket 540. Further, the elastic deformation area "S" is separated from the adjustment position using the adjustment screw member 520.

By having this structure, in the sensor position adjustment, it become possible to gently displace the elastic deformation area "S" to comparatively reduce the stress applied to the elastic deformation area "S". Further, the elastic deformation area "S" faces the relief part 542 of the fixing bracket 540 so as not to be seen from the rear side and is protected from an external force applied from the relief part 542.

Principle of the Sensor Position Adjustment Method

FIG. 10 is a rear view of the sensor position adjustment mechanism 400 according to the first embodiment. As illustrated in FIG. 10, the light emitting and receiving surface 302 of the first light emitting and receiving sensor 300 is mounted in a manner that the light emitting and receiving surface 302, which is orthogonal to the center line "D" of the first light emitting and receiving sensor 300, is disposed so as to be along the straight line "E" passing through a supporting point "C" which is assumed to be in the elastic deformation area "S" of the first optical sensor unit 360. Here, the supporting point "C" of the first optical sensor unit 360 is disposed in the elastic deformation area "S" of the print board 362.

The adjustment position "G" of the adjustment screw member 520 is disposed at the position separated from the center "F" of the light emitting and receiving surface 302 of the first light emitting and receiving sensor 300 in the diagonal direction (diagonally left upper direction). Here, the center "F" is the cross point between the straight line "E", which passes though the supporting point "C" assumed to be in the elastic deformation area "S and the light emitting and receiving surface 302, and the center line "D" of the first light emitting and receiving sensor 300.

Due the position of the adjustment position "G", it becomes possible that the displacement amount at the center "F" of the light emitting and receiving surface 302 of the first light emitting and receiving sensor 300 is less than the displacement amount at the adjustment position "G" relative to the rotated angle of the adjustment screw member 520. Therefore, it becomes easier to finely adjust the angle "θ" (see FIG. 6) which is around the axis of the straight line "E" in the diagonal, direction of the first light emitting and receiving sensor 300.

Further, the distance between the supporting point "C" assumed to be in the elastic deformation area "S" and the center "F" of the light emitting and receiving surface 302 is greater than the distance between the adjustment position "G" of the adjustment screw member 520 and the center "F" of the light emitting and receiving surface 302.

Due to the difference, when the angle "θ" of the first light emitting and receiving sensor 300 is finely adjusted, the displacement (distortion) amount of the print board 362 at the supporting point. "C" is alleviated (reduced), so that the fatigue of the elastic deformation area "S" in the print board 362 can be reduced.

In the sensor position adjustment mechanism 400, when the head part 522 of the adjustment screw member 520 is rotated around the axis thereof, the screw insertion section 420 at the adjustment position "G" is displaced in Za or Zb direction. At the same time, the position adjustment bracket 410 is inclined (tilted) around the supporting point "C". Due to the inclination, the light emitting and receiving surface 302 of the first light emitting and receiving sensor 300 disposed (positioned) on the straight line "E" is displaced in Za or Zb direction around the supporting point "C".

Further, when the light emitting and receiving surface 302 on the straight line "E" is displaced in Za or Zb direction, the first light emitting and receiving sensor 300 is displaced in Za or Zb direction orthogonal to the center line "D" of the first light emitting and receiving sensor 300. By doing this, it becomes possible to change the direction of the light emitting and receiving surface 302 in a manner that the adjustment position "G" on the center line "D" in the diagonal direction is used as the force apply point, so that the angle "θ" (FIG. 6) which is around the axis of the straight line "E" in the diagonal direction can be adjusted.

When the position adjustment of the angle "θ" of the first light emitting and receiving sensor 300 is adjusted by the sensor position adjustment mechanism 400, the following conditions 1 through 3 become important.

Condition 1: The direction (i.e., the angle "θ") of the light emitting and receiving surface 302 is adjusted so that the first light emitting and receiving sensor 300 can irradiate and receive the infrared light in the whole coordinate detection range of the coordinate detecting device 24. In the first embodiment, the adjustment is to be done so that the infrared light from the first light emitting and receiving sensor 300 can be irradiated to an intermediate position in a range inside the outlines of the reflection plates 330 and 340 (in the case of the second light emitting and receiving sensor 310, the infrared light is to be irradiated to an intermediate position in a range inside the outlines of the reflection plates 320 and 340).

Condition 2: Depending on the displacement of the light emitting and receiving surface 302 of the first light emitting and receiving sensor 300 in Za or Zb direction or the changed direction of the light emitting and receiving surface 302 (i.e., the angle "θ"), the irradiation range of the infrared light may be located outside the reflection plates 330 and 340. To resolve the problem, it is desired to perform a fine adjustment on the direction of angle "θ" of the light emitting and receiving surface 302 by using the adjustment screw member 520.

Condition 3: The following are the conditions in the case of the fine adjustment of the direction of angle "θ" of the light emitting and receiving surface 302.

Condition 3.1: It is preferable that the center of the first light emitting and receiving sensor 300 in Z direction corresponds to the position of the screw insertion section 420 of the position adjustment bracket 410 in Z direction.

Condition 3.2: In FIG. 10, it is preferable that the straight line "E", which passes through the supporting point "C" which is assumed to be in elastic deformation area "S" of the first optical sensor unit 360, and the center line "D" of the first light emitting and receiving sensor 300, which passes through the adjustment position "G" of the adjustment screw member 520 where the sensor position adjustment is done as the force apply point, are orthogonally crossed with each other.

Condition 3.3: it is preferable that the separation distance is small between the supporting point "C", which is assumed to be in elastic deformation area "S" of the first optical sensor unit 360, and the center of the first light emitting and receiving sensor 300 in Z direction.

Figure 11:
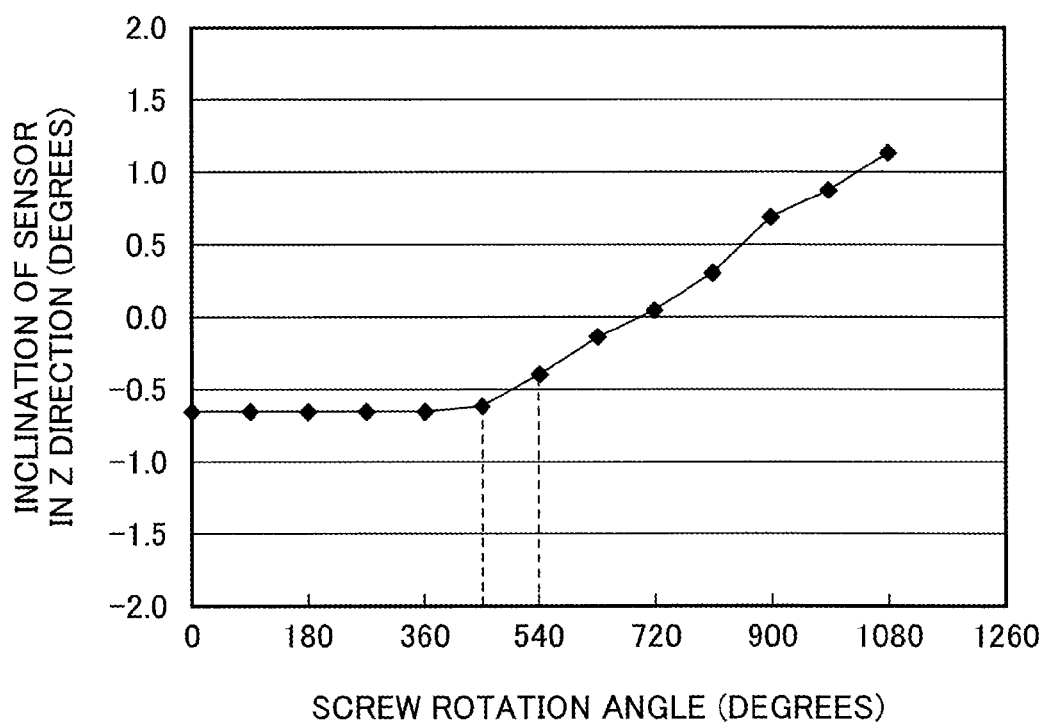
FIG. 11 is a graph illustrating an example relationship between an adjusting screw turning angle of the sensor position adjustment mechanism and the tilt in the Z direction of the detected sensor.

FIG. 11 is a graph illustrating a relationship between the adjustment screw rotation angle of the sensor position adjustment mechanism 400 and the inclination in Z direction of the detected sensor. Specifically, FIG. 11 illustrates the cases where the adjustment screw rotation angle of the sensor position adjustment mechanism 400 is changed every 90 degrees and the corresponding inclination angles in Z direction of the first light emitting and receiving sensor 300 are indicated. Here, in FIG. 11, in the range of the rotation angle from 360 degrees and 540 degrees, it is supposed that the head part 522 of the adjustment screw member 520 is not in contact with the screw insertion section 420 of the position adjustment bracket 410.

Further, after 540 degrees where the head part 522 of the adjustment screw member 520 begins to contact the screw insertion section 420 of the position adjustment bracket 410, FIG. 11 illustrates that the inclination in Z direction of the first light emitting and receiving sensor 300 is changed by (approximately) 0.25 degrees whenever the adjustment screw rotation angle of the sensor position adjustment mechanism 400 is changed by 90 degrees.

Here, it should be noted that FIG. 11 illustrates one example. In this regard, it is possible to adjust the inclination in Z direction of the first light emitting and receiving sensor 300 relative to the rotation angle of the adjustment screw member 520 to a desired value by, for example, changing the screw lead angle of the adjustment screw member 520.

Further, for example, by setting the rotation angle of the adjustment screw member 520 to be less than 90 degrees, it becomes possible to increase the resolution of the inclination of the first light emitting and receiving sensor 300.

Figure 12:
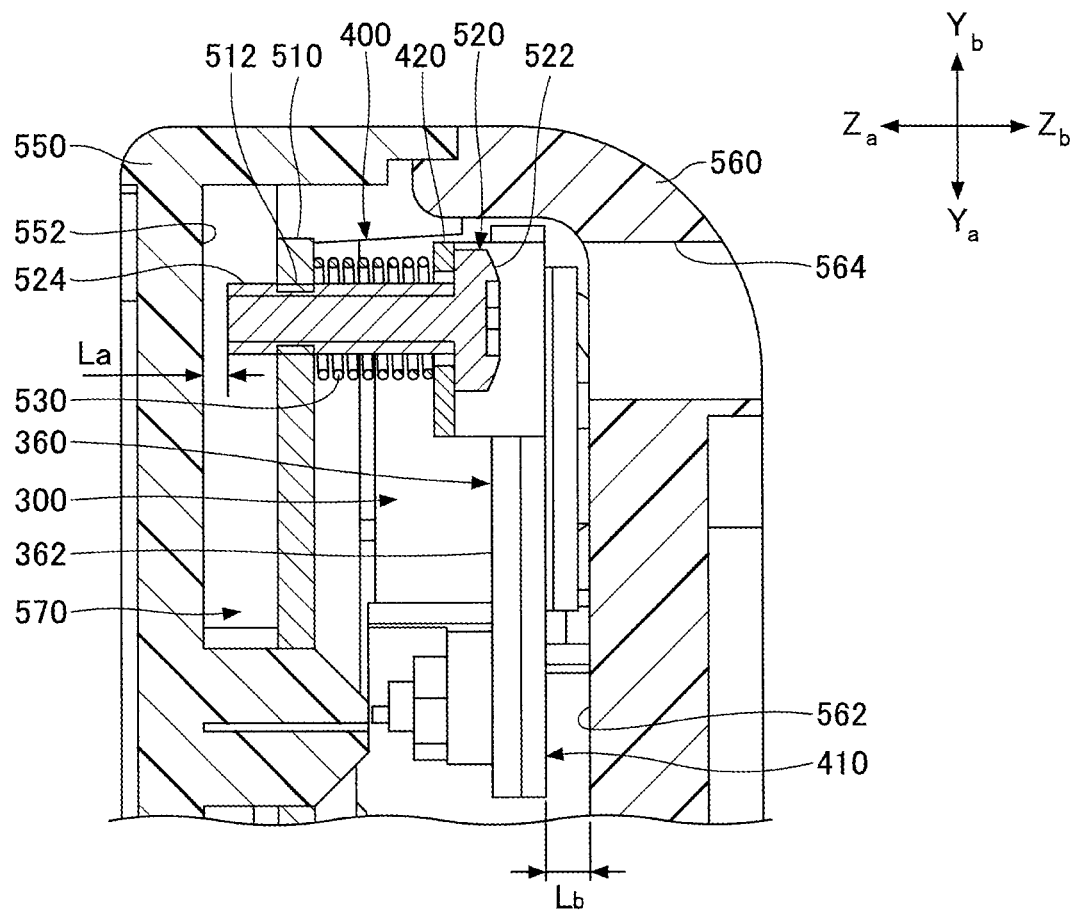
FIG. 12 is a vertical cross-sectional side view of the sensor position adjustment mechanism according to the first embodiment.

FIG. 12 is a vertical cross-sectional side view of the sensor position adjustment mechanism 400 according to the first embodiment. As illustrated in FIG. 12, the sensor position adjustment mechanism 400 is housed (placed) in a space 570 formed between a front-side housing 550 and an exterior cover 560 of the rear-side housing which are included in the housing 500 of the display section 20.

The adjustment range in Z direction by the adjustment screw member 520 is restricted by an inner wall 552 of the front-side housing 550 and an inner wall 562 of the exterior cover 560 which determine the space 570. Namely, the inner wall 552 of the front-side housing 550 and the inner wall 562 of the exterior cover 560 function (serve) as the stoppers to determine the adjustment range of the sensor position adjustment mechanism 400.

The screw part 524 of the adjustment screw member 520 is screwed into the screw hole 512 of the frame 510. Therefore, the gap "La" formed between the end part of the screw part 524 inserted through the frame 510 and the inner wall 552 of the front-side housing 550 is the adjustment range in Za direction.

Further, the adjustment range in Zb direction of the screw insertion section 420 which is in contact with the head part 522 of the adjustment screw member 520 is determined by the gap "Lb" formed between the rear surface of the position adjustment bracket 410 and the inner wall 562 of the exterior cover 560.

Therefore, the adjustment range when the adjustment screw member 520 is rotated by a tool is restricted by the gaps "La" and "Lb". Further, the gaps "La" and "Lb" are set (determined) in accordance with the possible amount of the elastic displacement of the elastic deformation area "S". Therefore, even when the sensor position adjustment operation is conducted up to the position where the rotation angle of the adjustment screw member 520 is maximized, it does not cause any problem.

Further, there is a tool insertion hole 564 formed through the exterior cover 560 at the position facing the head part 522 of the adjustment screw member 520. By using the tool insertion hole 564, when the sensor position adjustment operation is performed, it becomes possible to insert a tool into the tool insertion hole 564 from outside (rear surface side) while the exterior cover 560 is closed to rotate the head part 522 of the adjustment screw member 520 in the clockwise and counter-clockwise directions. Namely, the adjustment operation by the sensor position adjustment mechanism 400 can be conducted without removing the exterior cover 560.

Here, the sensor position adjustment method based on the rotating operation of the adjustment screw member 520 is described.

When the sensor position adjustment operation is conducted, a software program installed in the controller 60 or a personal computer connected to the controller 60 is started up. The software program for the sensor position adjustment realizes a determination means (method) to monitor a detection signal of the first light emitting and receiving sensor 300 which is output when the reflection light from the reflection plates 330 and 340 is received and determine whether the image acquired based on the detection signal is in a predetermined control window.

FIGS. 13A and 13B illustrate example relative positions between a detected irradiation pattern and a control window before and after the sensor position adjustment according to the first embodiment. As illustrated in FIG. 13A, the image of the irradiation pattern "J" acquired based on the light reception detection signal is the combination of the irradiation pattern "J1" of the reflection plate 330 and the irradiation pattern "J2" of the reflection plate 340. Further, the irradiation pattern "J" includes the inclination viewed from the first light emitting and receiving sensor 300, the inclination "α" of the irradiation pattern "J1" differs from the inclination "β" of the irradiation pattern "J2".

For example, when it is detected that an edge part of the irradiation patterns "J1" and "J2" protrudes outside a control window "K", an error is determined (detected). Here, the control window "K" refers to a virtual scale indicating the detection possible area of the reflection plate 340 formed by the software program. Further, the control window "K" is set in the middle height position in the adjustment frame "H" which indicates the adjustment possible range.

Namely, the width in the vertical axis direction of the adjustment frame "H" is determined (set) based on the width direction in Z direction of the reflection plates 320, 330, and 340. Therefore, when the control window "K" is located in the middle height position in the vertical axis direction; by setting the irradiation pattern inside the control window "K", it becomes possible to automatically adjust the irradiation pattern into the middle height position in Z direction of the reflection plates 320, 330, and 340.

In the first embodiment, as illustrated in FIG. 13A, it is detected that the irradiation pattern "J1" of the first light emitting and receiving sensor 300 is outside the control window "K" at the left lower corner part of irradiation position of the infrared light of the coordinate detecting device 24. In addition, it is also detected that irradiation pattern "J2" is outside the control window "K" at the right lower corner part of the coordinate detecting device 24.

Although the irradiation patterns "J1" and "J2" have the respective particular inclinations, the width "M1" of the irradiation patterns "J1" and "J2" in the vertical axis direction is narrower than the width of the control window "K". Therefore, there is no problem in the inclinations of the irradiation patterns "J1" and "J2" and what is desired is to adjust the position of the control window "K" in the vertical axis direction.

Then, the adjustment screw member 520 of the sensor position adjustment mechanism 400 is rotated around the axis thereof to finely adjust the angle "G" (see FIG. 6) around the axis of the straight line "E" in the diagonal direction of the first light emitting and receiving sensor 300.

As the adjustment method thereof, the print board 362 on which the first light emitting and receiving sensor 300 is mounted and the screw insertion section 420 of the position adjustment bracket 410 fastened to the print board 362 are displaced in Za or Zb direction so as to adjust the angle "θ" of the light irradiating and receiving direction of the infrared light from the first light emitting and receiving sensor 300.

As illustrated in FIG. 13B, by the above sensor position adjustment operation, the irradiation patterns "J1" and "J2" are displaced in the vertical axis direction. The adjustment operation of the adjustment screw member 520 is continued until the irradiation patterns "J1" and "J2" are relatively included inside the control window "K". Therefore, the operator determines the rotation direction and adjusts the rotation angle of the adjustment screw member 520 so that the position of the irradiation patterns "J1" and "J2" in the vertical direction displayed on the personal computer or the display section is inside the control window "K".

As described, the irradiation patterns "J1" and "J2" are adjusted to be inside of the control window "K" set in the intermediate position in the vertical axis direction of the adjustment frame "H". Therefore, for example, even when an impact is applied to the first optical sensor unit 360, it becomes possible for irradiation patterns "J1" and "J2" to be significantly displaced outside the control window "K", so that it becomes possible to accurately detect the contacting position (coordinate position) of the pen nib of the pen-shaped input device 100 (target to be detected).

When the position of the irradiation patterns "J1" and "J2" is moved in the vertical axis direction to be adjusted, the controller 60 executes a control program (determination means) to determine whether the whole image of the irradiation patterns "J1" and "J2" is located inside the control window "K".

Second Embodiment

Figure 14:
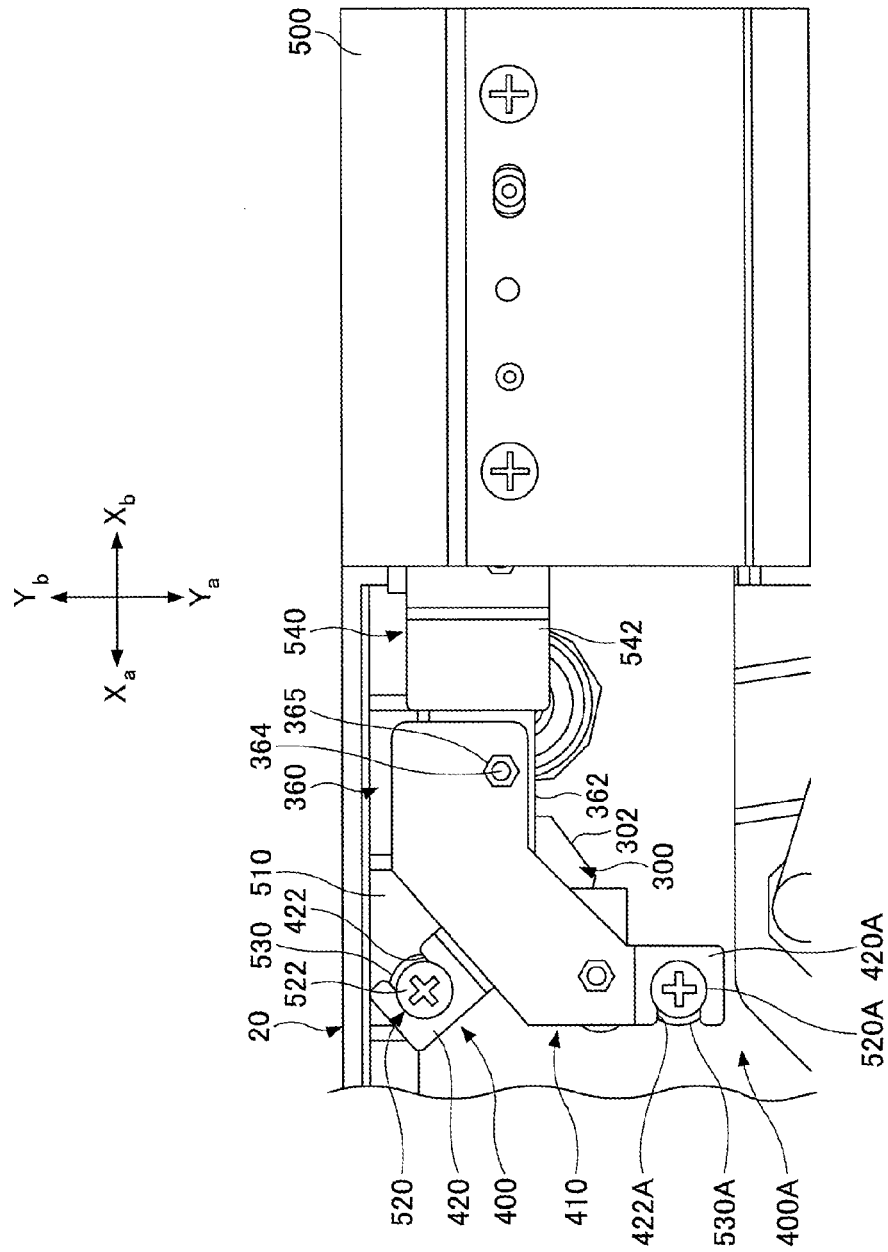
FIG. 14 illustrates an example sensor position adjustment mechanism according to a second embodiment.
Figure 15:
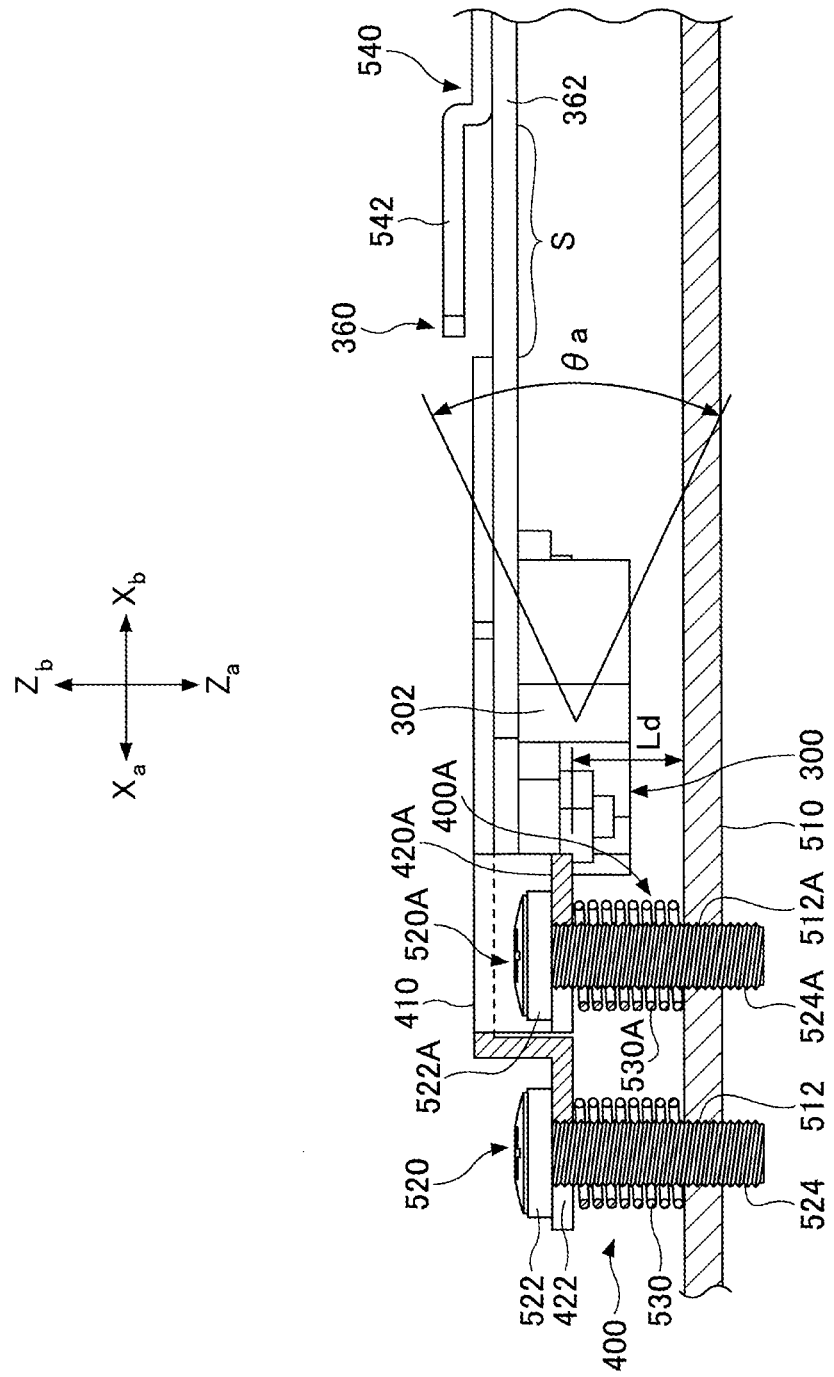
FIG. 15 is a bottom view of the sensor position adjustment mechanism according to the second embodiment.
Figure 17A:
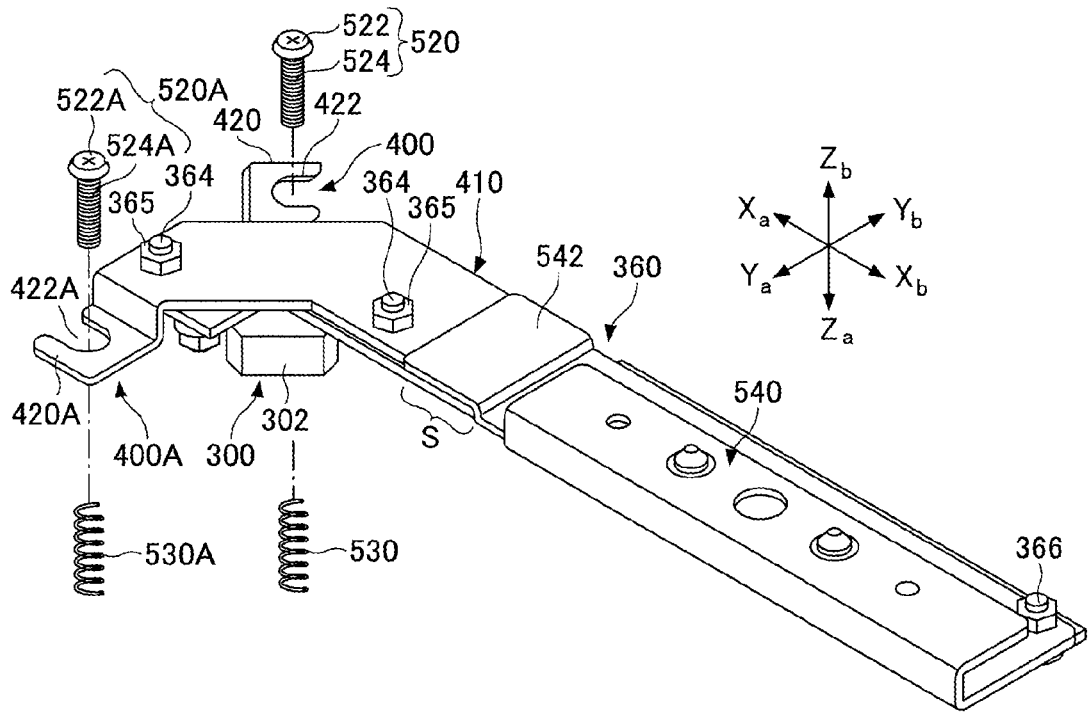
FIGS. 17A and 17B are perspective views of an example configuration of an optical sensor unit according to the second embodiment.
Figure 17B:
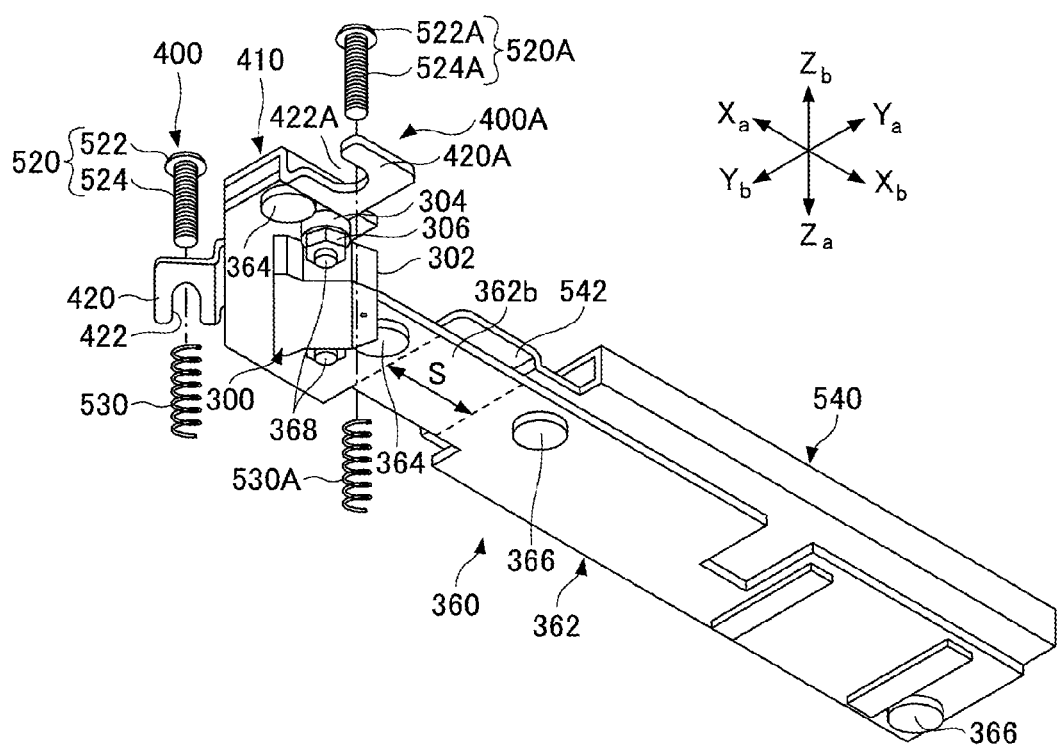

FIG. 14 is a front view of the sensor position adjustment mechanism according to a second embodiment. FIG. 15 is a bottom view of the sensor position adjustment mechanism according to the second embodiment. FIG. 16 is a perspective rear view of the sensor position adjustment mechanism according to the second embodiment. FIG. 17 is a perspective view of an optical sensor unit according to the second embodiment.

As illustrated in FIGS. 14 through 17, a coordinate detecting device according to the second embodiment includes a first sensor position adjustment mechanism 400 and a second sensor position adjustment mechanism 400A. Here, the configuration of the first sensor position adjustment mechanism 400 is the same as that of the sensor position adjustment mechanism 400 described above. Therefore, the repeated description thereof is omitted.

The second sensor position adjustment mechanism 400A includes the position adjustment bracket 410, a screw insertion section 420A, which protrudes from the head part of the position adjustment bracket 410 to the side of the display section 20 (in Ya direction), and an adjustment screw member 520A (second adjustment means) which is inserted through the screw insertion section 420A.

By rotating a head part 522A of the adjustment screw member 520A in the tightening direction (clockwise direction) with a tool such as the screw driver, the screw insertion section 420 of the position adjustment bracket 410 is displaced (moved) in the front direction (Za direction) so as to be adjusted in the manner that the distance "Ld" (see FIG. 15) is reduced.

On the other hand, by rotating the head part 522A of the adjustment screw member 520A in the loosening direction (counter-clockwise direction) with the tool such as the screw driver, the pressing force of the screw insertion section 420 applying to the frame 510 side is loosened. Therefore, the screw insertion section 420A is displaced in the rear direction (Zb direction) due to the pressing force (spring force) of a coil spring 530A, so as to be adjusted in the manner that the distance "Ld" (see FIG. 15) is increased.

Further, there is a coil spring (elastic member) 530A between the screw insertion section 420A and the frame 510. The coil spring 530A presses the screw insertion section 420A in Zb direction so that the screw insertion section 420A is to be separated from the frame 510. Due to this, even in a case where an impact is applied to the first optical sensor unit 360 when the pen-shaped input device 100 is in strong contact with the display surface 22 of the display section 20, the impact can be absorbed by the coil spring 530A (impact absorption means (mechanism)).

By having the structure described above, it becomes possible to prevent the position displacement of the first optical sensor unit 360 and accurately receive the reflection light from the reflection plates 320, 330, and 340 (optical reflection members).

Further, in the second embodiment, due to the existence of the coil spring 530A in the second sensor position adjustment mechanism 400A in addition to the existence of the coil spring 530 in the first sensor position adjustment mechanism 400, it becomes possible to absorb greater impact than that in the first embodiment. Namely, it becomes possible to have greater impact resistance than that in the first embodiment.

In place of the coil spring 530A, an elastic member such as a torsion spring, a leaf spring, etc. or a dumper member such as rubber, an air spring, etc. may be used.

As described, by rotating the head part 522A of the adjustment screw member 520A in the loosening direction (counter-clockwise direction) with the tool such as the screw driver, the pressing force of the screw insertion section 420 applying to the frame 510 side is loosened. By rotating the head part 522 of the adjustment screw member 520 in this manner, the screw insertion section 420A of the position adjustment bracket 410 is displaced in Za and Zb directions and the end part of the print board 362 of the first optical sensor unit 360 to which the position adjustment bracket 410 is fixed is also displaced in Za and Zb directions.

Principle of the Sensor Position Adjustment Method

Figure 18:
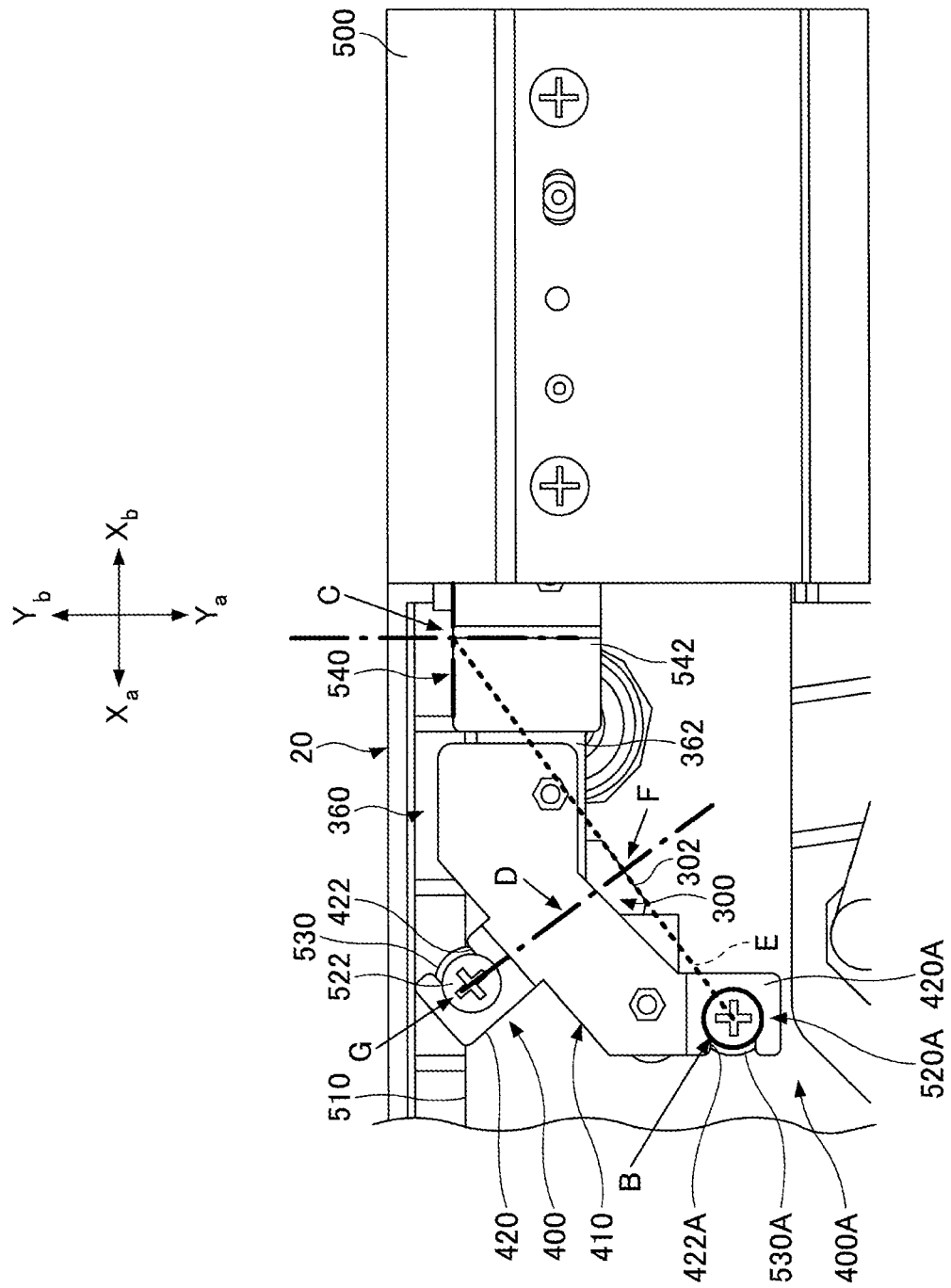
FIG. 18 is a rear view of the sensor position adjustment mechanism according to the second embodiment.

FIG. 18 is a rear view of the sensor position adjustment mechanism according to the second embodiment. As described, the sensor position adjustment mechanism according to the second embodiment includes the first sensor position adjustment mechanism 400 and the second sensor position adjustment mechanism 400A. The principle of the position adjustment using the first sensor position adjustment mechanism 400 is the same as that described in the first embodiment. Therefore, in the following, the principle of the position adjustment using the second sensor position adjustment mechanism 400A is described.

As illustrated in FIG. 18, the light emitting and receiving surface 302 of the first light emitting and receiving sensor 300 is mounted in a manner that the light emitting and receiving surface 302 is disposed so as to be along the straight line "E" which passes through an adjustment point "B" of the adjustment screw member 520A to be used for the sensor position adjustment and the supporting point "C" which is assumed to be in the elastic deformation area "S" of the first optical sensor unit 360. Here, the supporting point "C" of the first optical sensor unit 360 is disposed in the elastic deformation area "S" of the print board 362.

Further, in the second embodiment, the adjustment screw member 520A is disposed in a manner that the distance between the position of the adjustment screw member 520A and the supporting point "C" which is assumed to be in the elastic deformation area "S" of the first optical sensor unit 360 is greater than the distance between the center line "D" and the supporting point "C".

Due the position of the adjustment position "B", it becomes possible that the displacement amount of the first light emitting and receiving sensor 300 is less than the displacement amount at the adjustment position "B" relative to the rotated angle of the adjustment screw member 520A. Therefore, it becomes easier to finely adjust the angle "θa" (see FIG. 15) which is around the axis of the straight line "D" of the first light emitting and receiving sensor 300.

In the second sensor position adjustment mechanism 400A, when the head part 522A of the adjustment screw member 520A is rotated around the axis thereof, the screw insertion section 420A at the adjustment position "B" is displaced in Za or Zb direction. At the same time, the position adjustment bracket 410 is inclined (tilted) around the supporting point "C". Due the inclination, the light emitting and receiving surface 302 of the first light emitting and receiving sensor 300 disposed (positioned) on the straight line "E", which passes through the adjustment position "B" and the supporting point "C", is displaced in Za or Zb direction around the supporting point "C".

Further, when the light emitting and receiving surface 302 on the straight line "E" is displaced in Za or Zb direction, the first light emitting and receiving sensor 300 is displaced in Za or Zb direction orthogonal to the center line "D" of the first light emitting and receiving sensor 300. By doing this, it becomes possible to change the direction of the light emitting and receiving surface 302 in a manner that a position on the center line "D" is used as the supporting point, so that the angle "θa" (FIG. 15) which is around the axis of the center line "D" can be adjusted.

When the position adjustment of the first light emitting and receiving sensor 300 is adjusted by the second sensor position adjustment mechanism 400A, the following conditions 1A through 3A become important.

Condition 1A: The direction (i.e., the angle "θa") of the light emitting and receiving surface 302 is adjusted so that the first light emitting and receiving sensor 300 can irradiate and receive the infrared light in the whole coordinate detection range of the coordinate detecting device 24. Similar to the first embodiment, the adjustment is to be done so that the infrared light from the first light emitting and receiving sensor 300 can be irradiated to an intermediate position in a range inside the outlines of the reflection plates 330 and 340 (in the case of the second light emitting and receiving sensor 310, the infrared light is to be irradiated to an intermediate position in a range inside the outlines of the reflection plates 320 and 340).

Condition 2A: Depending on the displacement of the light emitting and receiving surface 302 of the first light emitting and receiving sensor 300 in Za or Zb direction, the irradiation range of the infrared light may be located outside the reflection plates 330 and 340. To resolve the problem, it is desired to perform a fine adjustment on the direction of angle "θa" of the light emitting and receiving surface 302 by using the adjustment screw member 520A.

Condition 3A: The followings are the conditions in the case of the fine adjustment of the direction of angle "θa" of the light emitting and receiving surface 302.

Condition 3A.1: It is preferable that the center of the first light emitting and receiving sensor 300 in Z direction corresponds to the position of the screw insertion section 420A of the position adjustment bracket 410 in Z direction.

Condition 3A.2: In FIG. 18, it is preferable that the straight line "E", which passes through the adjustment position "B" of the adjustment screw member 520A where the sensor position adjustment is done as the force apply point and the supporting point "C" which is assumed to be in elastic deformation area "S" of the first optical sensor unit 360, and the center line "D" of the first light emitting and receiving sensor 300 are orthogonally crossed with each other.

Condition 3A.3: It is preferable that the separation distance is small between the supporting point "C", which is assumed to be in elastic deformation area "S" of the first optical sensor unit 360, and the center of the first light emitting and receiving sensor 300 in Z direction.

Figure 19:
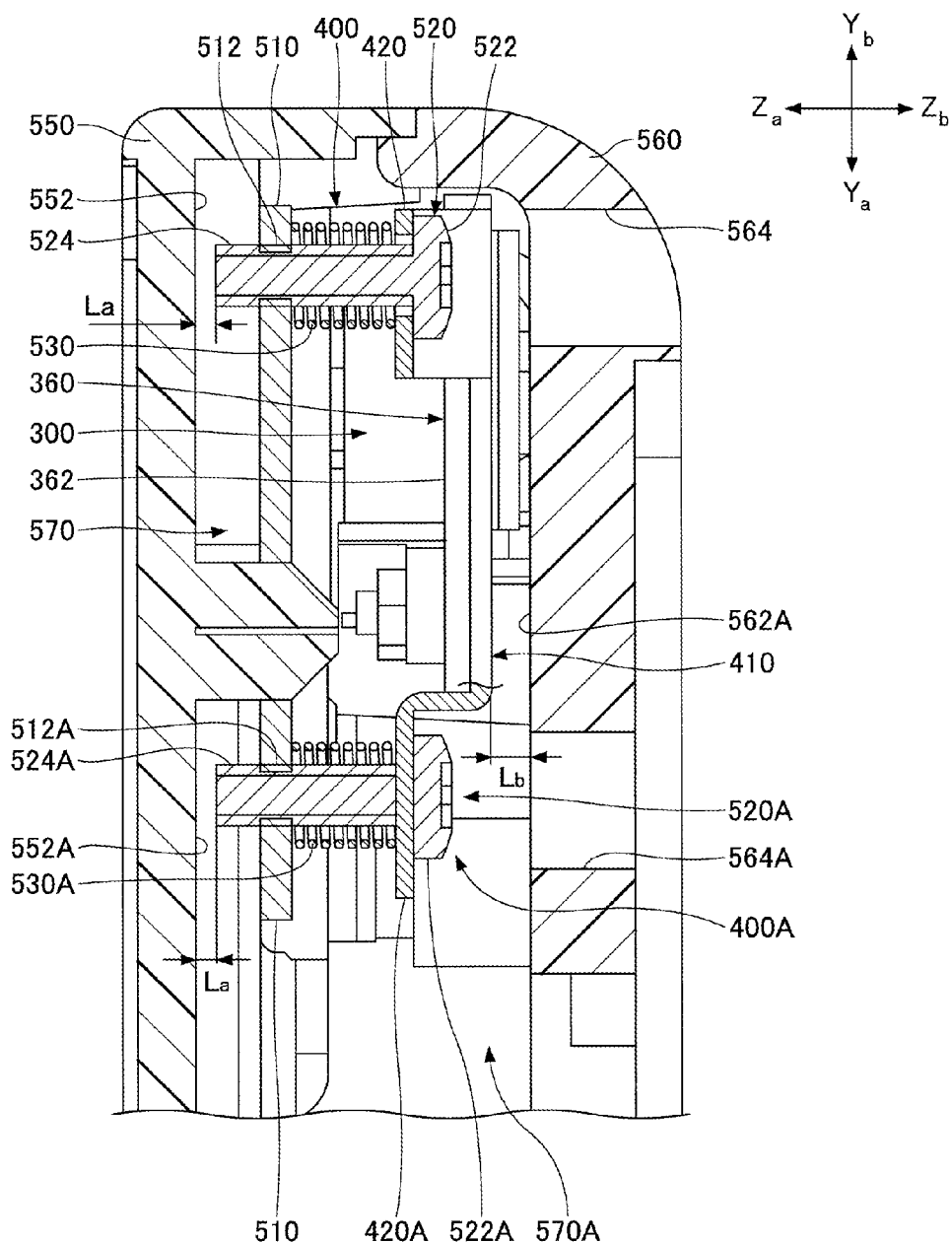
FIG. 19 is a vertical cross-sectional side view of the sensor position adjustment mechanism according to the second embodiment.

FIG. 19 is a vertical cross-sectional side view of the second sensor position adjustment mechanism 400A according to the second embodiment. As illustrated in FIG. 19, the second sensor position adjustment mechanism 400A is housed (placed) in the space 570A formed between the front-side housing 550 and the exterior cover 560 of the rear-side housing which are included in the housing 500 of the display section 20.

The adjustment range in Z direction by the adjustment screw member 520A is restricted by the inner wall 552A of the front-side housing 550 and the inner wall 562A of the exterior cover 560 which determine the space 570A. Namely, the inner wall 552A of the front-side housing 550 and the inner wall 562A of the exterior cover 560 function (serve) as the stoppers to determine the adjustment range of the second sensor position adjustment mechanism 400A.

The screw part 524A of the adjustment screw member 520A is screwed into the screw hole 512A of the frame 510. Therefore, the gap "La" formed between the end part of the screw part 524A inserted through the frame 510 and the inner wall 552A of the front-side housing 550 is the adjustment range in Za direction.

Further, the adjustment range in Zb direction of the screw insertion section 420A which is in contact with the head part 522A of the adjustment screw member 520A is determined by the gap "Lb" formed between the rear surface of the position adjustment bracket 410 and the inner wall 562A of the exterior cover 560.

Therefore, the adjustment range when the adjustment screw member 520A is rotated by a tool is restricted by the gaps "La" and "Lb". Further, the gaps "La" and "Lb" are set (determined) in accordance with the possible amount of the elastic displacement of the elastic deformation area "S". Therefore, even when the sensor position adjustment operation is conducted up to the position where the rotation angle of the adjustment screw member 520A is maximized, it does not cause any problem.

Further, there is a tool insertion hole 564A formed through the exterior cover 560 at the position facing the head part 522A of the adjustment screw member 520A. By using the tool insertion hole 564A, when the sensor position adjustment operation is performed, it becomes possible to insert a tool into the tool insertion hole 564A from outside (rear surface side) while the exterior cover 560 is closed to rotate the head part 522A of the adjustment screw member 520A in the clockwise and counter-clockwise directions. Namely, the adjustment operation by the second sensor position adjustment mechanism 400A can be conducted without removing (opening) the exterior cover 560.

Here, the sensor position adjustment method based on the rotating operation of the adjustment screw member 520A is described.

When the sensor position adjustment operation is conducted, a software program installed in the controller 60 or a personal computer connected to the controller 60 is started up. The software program for the sensor position adjustment realizes the determination means (method) to monitor the detection signal of the first light emitting and receiving sensor 300 which is output when the reflection light from the reflection plates 330 and 340 is received and determine whether the image acquired based on the detection signal is in a predetermined control window.

Figures 20A, 20B, 20C:
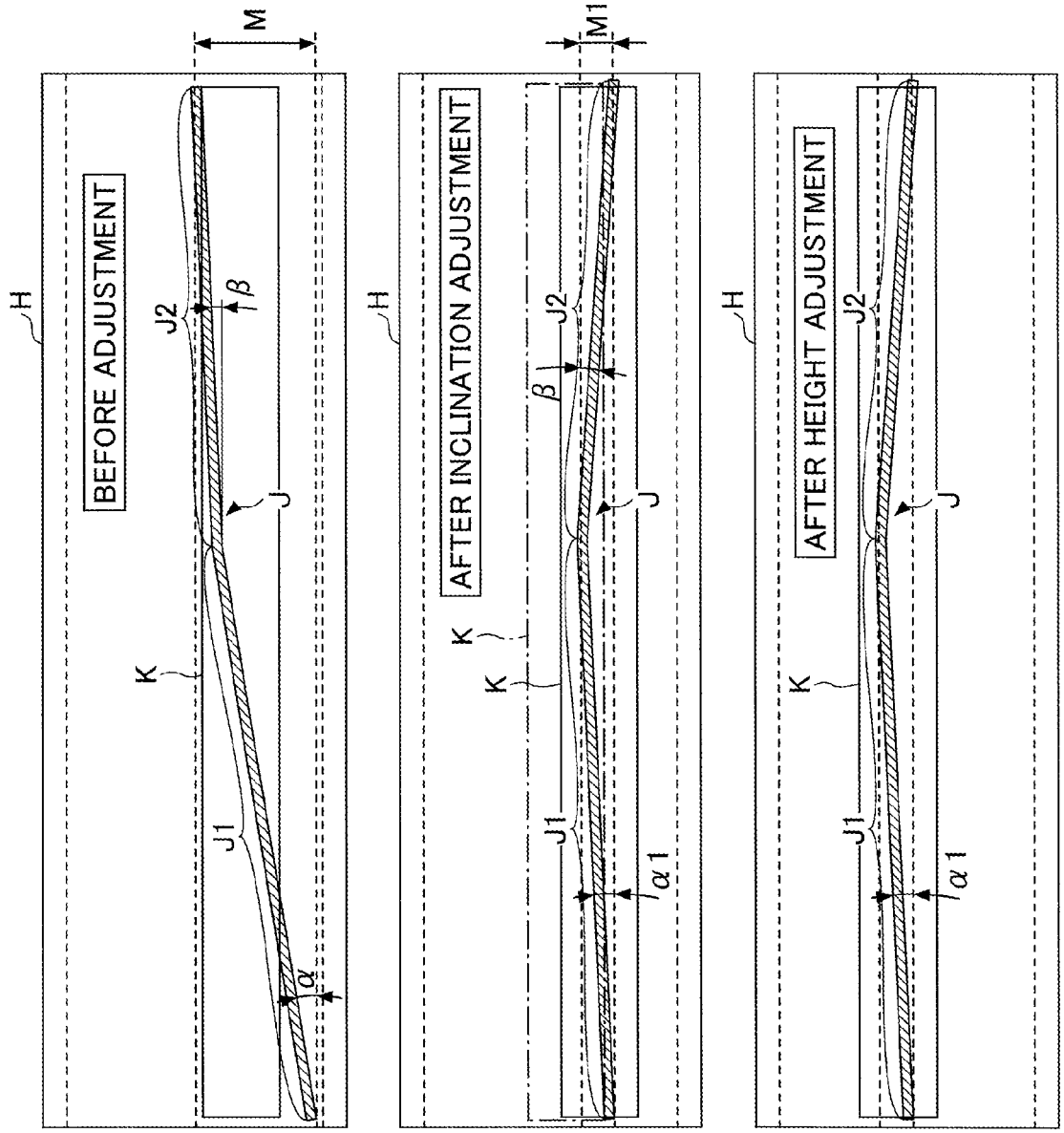
FIGS. 20A through 20C are drawings illustrating example relative positions between the detected irradiation pattern and the control window before and after the sensor position adjustment according to the second embodiment.

FIGS. 20A through 20C illustrate example relative positions between a detected irradiation pattern and a control window before and after the sensor position adjustments according to the second embodiment. As illustrated in FIG. 20A, the image of the irradiation pattern "J" acquired based on the light reception detection signal is the combination of the irradiation pattern "J1" of the reflection plate 330 and the irradiation pattern "J2" of the reflection plate 340.

Further, the irradiation pattern "J" includes the inclination viewed from the first light emitting and receiving sensor 300, the inclination "a" of the irradiation pattern "J1" differs from the inclination "a" of the irradiation pattern "J2". In this case, the width "M" of the irradiation pattern "J1" in the vertical axis direction is greater than the width of the control window "K" in the vertical axis direction.

Due to this, it is detected that the left end part of the irradiation pattern "J1" protrudes outside the control window "K", which has a horizontally long rectangular shape, so that an error is determined (detected). Here, the control window "K" refers to a virtual scale indicating the detection possible area of the reflection plate 340 formed by the software program. In this case, based on the irradiation pattern "J1" of the first light emitting and receiving sensor 300, it is detected that irradiation position of the infrared light near the left lower corner part of the coordinate detecting device 24 in the irradiation pattern "J1" protrudes outside the control window "K".

Then, the adjustment screw member 520A of the second sensor position adjustment mechanism 400A is rotated around the axis thereof to finely adjust the angle "θa" (see FIG. 15) around the axis of the center line "D" of the first light emitting and receiving sensor 300.

As the adjustment method thereof, the print board 362 on which the first light emitting and receiving sensor 300 is mounted and the screw insertion section 420A of the position adjustment bracket 410 fastened to the print board 362 are displaced in Za or Zb direction so as to adjust the angle "θa" around the axis of the center line "D" of the first light emitting and receiving sensor 300.

As illustrated in FIG. 20B, by the above sensor position adjustment operation using the adjustment screw member 520A of the second sensor position adjustment mechanism 400A, the inclination "α" relative to the horizontal axis of the irradiation pattern is reduced to "α1" (α>α1), so that the width "M" of the control window is accordingly reduced to "M1" (M>M1). Therefore, it becomes possible that the irradiation pattern can be included inside the control window "K".

On the other hand, when the adjustment screw member 520A is rotated in the direction opposite to the above direction, the inclinations "ac" and "a" are increased, so that the irradiation patterns protrude outside greatly. Therefore, it is preferable that an operator monitor the change of the inclination of the irradiation pattern "J1" displayed on the monitor of the personal computer or the display section, and determine the rotation direction and adjust the rotation angle of the adjustment screw member 520A.

On the other hand, as illustrated in the dashed dotted line of FIG. 20B, when the control window "K" is shifted in the vertical axis direction to the middle part of the adjustment frame "H", it is detected that the irradiation position of the infrared light near the left lower corner part of the coordinate detecting device 24 in the irradiation pattern "J1" protrudes outside the control window "K".

Further, it is also detected that the irradiation position of the infrared light near the right lower corner part of the coordinate detecting device 24 in the irradiation pattern "J2" protrudes outside the control window "K".

Although the irradiation patterns "J1" and "J2" have the respective particular inclinations, the width "M1" of the irradiation patterns "J1" and "J2" in the vertical axis direction is narrower than the width of the control window "K". Therefore, there is no problem in the inclinations of the irradiation patterns "J1" and "J2" and what is desired is to adjust the position of the control window "K" in the vertical axis direction.

Then, the adjustment screw member 520 of the sensor position adjustment mechanism 400 is rotated around the axis thereof to finely adjust the angle "θ" (see FIG. 6) around the axis of the straight line "E" in the diagonal direction of the first light emitting and receiving sensor 300.

As the adjustment method thereof, the print board 362 on which the first light emitting and receiving sensor 300 is mounted and the screw insertion section 420 of the position adjustment bracket 410 fastened to the print board 362 are displaced in Za or Zb direction so as to adjust the angle "θ" of the light irradiating and receiving direction of the infrared light from the first light emitting and receiving sensor 300.

As illustrated in FIG. 20C, the position of the control window "K" in the vertical axis direction is set to the middle height position in the adjustment frame "H". Here, the width of the adjustment frame "H" in the vertical axis direction is determined in accordance with the width size of the reflection plates 320, 330, and 340 in Z direction. Therefore, in a case where the control window "K" is disposed (located) in the center position, by setting the irradiation pattern inside the control window "K", it becomes possible to adjust irradiation range of the infrared light to be included within the middle position of the reflection plates 320, 330, and 340 in Z direction.

As described, the irradiation patterns "J1" and "J2" are adjusted to be inside of the control window "K" set in the intermediate position in the vertical axis direction of the adjustment frame "H". Therefore, for example, even when an impact is applied to the first optical sensor unit 360, it becomes possible for irradiation patterns "J1" and "J2" to be significantly displaced outside the control window "K", so that it becomes possible to accurately detect the contacting position (coordinate position) of the pen nib of the pen-shaped input device 100 (target to be detected).

When the position of the irradiation patterns "J1" and "J2" is moved in the vertical axis direction to be adjusted, the controller 60 executes a control program (determination means (process)) to determine whether the whole image of the irradiation patterns "J1" and "J2" is located inside the control window "K".

In the above description, the electronic information board system 10 is exemplarily described that detects the coordinates when the pen-shaped input device 100 is in contact with the display surface of the electronic information board system 10. However, it should be noted that the present invention is not limited to the configuration described above. For example, the present invention may also be applied to a display device or a terminal device including a coordinate detecting device based on a method where such a pen-shaped input device is not used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A coordinate detecting device configured to be utilized in an electronic information board system, the electronic information board system including,
    a display section including a display surface and a frame, the display surface configured to contact a target to be detected, the frame having four sides surrounding the display surface,
    optical reflectors at first to third sides of the display section, respectively, and
    two optical sensors at respective ends of a fourth side of the display section, the two the optical sensors including respective light emitting and receiving surfaces configured to irradiate and receive light, the optical sensors each including a light emitting and receiving sensor on a print board, the light emitting and receiving sensor configured to irradiate light to a respective one of the optical reflectors and receive reflection light from a respective one of the optical reflectors, the print board having base ends fastened to the frame of the display section, and brackets fastened to a rear surface of the print boards, the reflection light providing information indicating a coordinate position where the target to be detected is in contact with the display surface,
    the coordinate detecting device comprising:
        adjustment devices configured to adjust the respective light emitting and receiving surfaces of the optical sensors where the reflection light is irradiated and received, and
        impact absorbers configured to absorb impact applied to the respective optical sensors.

2. The coordinate detecting device according to claim 1, wherein the impact absorbers include an elastic member that is elastically deformed so as to absorb the impact applied to the respective optical sensors.

3. The coordinate detecting device according to claim 1, wherein
    the adjustment devices include respective first adjustment screw members configured to adjust respective distances between the frame and the brackets in a diagonal direction of the optical sensors and the display section, and
    the adjustment devices are configured to adjust the respective light emitting and receiving surfaces by adjusting positions of the light emitting and receiving surfaces of the light emitting and receiving sensors based on screwed amounts of the first adjustment screw members.

4. The coordinate detecting device according to claim 1, wherein the adjustment devices include,
    respective first adjustment screw members configured to adjust respective distances between the frame and the brackets in a diagonal direction of the optical sensors and the display section, and
    respective second adjustment screw members configured to adjust respective distances between the frame and the brackets in horizontal direction of the optical sensors and the display section; and
    wherein the adjustment units are configured to adjust the respective light emitting and receiving surfaces by adjusting height positions of light receiving patterns of the received reflection light based on screwed amounts of the first adjustment screw members and by adjusting inclinations of irradiation patterns of the reflection light based on screwed amounts of the second adjustment screw members.

5. The coordinate detecting device according to claim 4, wherein the elastic member is provided between the first adjustment screw members and the optical sensors and between the second adjustment screw members and the optical sensors, and the elastic member is configured to displace the optical sensors to be separated from the frame when the first adjustment screw members or the second adjustment screw members are rotated to be loosened.

6. The coordinate detecting device according to claim 4, wherein the screwed amounts of the first adjustment screw members and the second adjustment screw members are adjusted with a tool inserted through respective tool insertion holes formed though external covers covering a rear surface side of the display section.

7. An electronic information board system comprising:
the coordinate detecting device according to claim 1;

the display section;
the two optical sensors;
the optical reflectors; and
a processor configured to calculate, using a triangulation method, the coordinate position where the target to be detected is in contact with the display surface based on the reflection light from the optical reflectors that is not received by the optical sensors due to the existence of the target.

8. The electronic information board system according to claim 7, wherein the processor is further configured to determine whether an optical image irradiated from the optical sensors is included within a control window of the optical reflectors.

9. The electronic information board system according to claim 8, wherein the processor is further configured to adjust the light irradiation direction of the optical sensors based on whether the optical image is within the control window.

10. An electronic information board system comprising:

a display section including a display surface and a frame, the display surface configured to contact a target to be detected, the frame having four sides surrounding the display surface;

two optical sensors at respective ends of one side of the display section and including respective light emitting and receiving surfaces to irradiate and receive light;

optical reflectors at respective other three sides of the display section;

a coordinate detecting device including adjustment devices and impact absorbers, the adjustment devices configured to adjust the respective light emitting and receiving surfaces of the optical sensors where the reflection light is irradiated and received, and the impact absorbers configured to absorb impact applied to the respective optical sensors; and a processor configured to calculate, using a triangulation method, a coordinate position where the target to be detected is in contact with the display surface based on the reflection light from the optical reflectors that is not received by the optical sensors due to the existence of the target.

* * * * *